(12) United States Patent
Hanley et al.

(10) Patent No.: US 12,447,427 B2
(45) Date of Patent: Oct. 21, 2025

(54) FILTER MEDIA, FILTERS, AND METHODS FOR MAKING THE SAME

(71) Applicant: Resolute FP Canada, Inc., Montreal (CA)

(72) Inventors: Shaune John Hanley, Montreal (CA); Cloé Bouchard-Aubin, Pointe-Claire (CA); Natalie Page, Pointe-Claire (CA); François Drolet, Pointe-Claire (CA)

(73) Assignee: Resolute FP Canada, Inc., Montreal (CA)

( * ) Notice: Subject to any disclaimer, the term of this patent is extended or adjusted under 35 U.S.C. 154(b) by 220 days.

(21) Appl. No.: 17/442,723

(22) PCT Filed: Mar. 26, 2020

(86) PCT No.: PCT/US2020/024876
§ 371 (c)(1),
(2) Date: Sep. 24, 2021

(87) PCT Pub. No.: WO2020/198428
PCT Pub. Date: Oct. 1, 2020

(65) Prior Publication Data
US 2022/0161170 A1    May 26, 2022

Related U.S. Application Data

(60) Provisional application No. 62/824,030, filed on Mar. 26, 2019.

(51) Int. Cl.
*B01D 39/00* (2006.01)
*B01D 39/18* (2006.01)

(52) U.S. Cl.
CPC ...... *B01D 39/18* (2013.01); *B01D 2239/0266* (2013.01); *B01D 2239/0457* (2013.01); *B01D 2239/10* (2013.01)

(58) Field of Classification Search
CPC .... B01D 2239/0266; B01D 2239/0457; B01D 2239/10; B01D 39/18
(Continued)

(56) References Cited

U.S. PATENT DOCUMENTS 3,709,658 A * 1/1973 Walsh ................. D06M 13/412
8/129
4,162,279 A * 7/1979 Walsh ................. D06M 13/447
558/170
(Continued)

FOREIGN PATENT DOCUMENTS

CN    106436309 A    2/2017
CN    107373017 A    11/2017
(Continued)

OTHER PUBLICATIONS

ANSI/ASHRAE Standard 52.2-2017 (Year: 2017).*
(Continued)

*Primary Examiner* — T. Bennett McKenzie
(74) *Attorney, Agent, or Firm* — Troutman Pepper Locke LLP; James E. Schutz; Chris N. Davis

(57) ABSTRACT

Filter media and filters comprising a fibrous material, a bonding material, and a flame-resistant treatment composition are disclosed herein. Methods of making and using the same are also disclosed herein.

15 Claims, 14 Drawing Sheets

(58) Field of Classification Search
USPC .......................................................... 55/524
See application file for complete search history.

(56) References Cited

U.S. PATENT DOCUMENTS

| | | | | |
|---|---|---|---|---|
| 4,453,553 | A | 6/1984 | Cohn | |
| 5,800,586 | A * | 9/1998 | Cusick | B01D 39/202 |
| | | | | 428/184 |
| 7,878,301 | B2 | 2/2011 | Gross et al. | |
| 10,433,593 | B1 * | 10/2019 | Dilanni | A41D 3/02 |
| 2009/0019825 | A1 | 1/2009 | Skirius et al. | |
| 2010/0319543 | A1 * | 12/2010 | Witsch | B01D 46/2484 |
| | | | | 162/100 |
| 2011/0259813 | A1 * | 10/2011 | Wertz | B01D 39/1615 |
| | | | | 264/510 |
| 2012/0272829 | A1 * | 11/2012 | Fox | B01J 20/10 |
| | | | | 96/154 |
| 2015/0147478 | A1 * | 5/2015 | Shutt | D06M 13/184 |
| | | | | 427/427.7 |
| 2015/0273372 | A1 * | 10/2015 | Demmel | B01D 39/163 |
| | | | | 55/482 |
| 2016/0067647 | A1 * | 3/2016 | Tate | B01D 46/523 |
| | | | | 156/219 |
| 2016/0074789 | A1 * | 3/2016 | Israel | B01D 39/2068 |
| | | | | 427/125 |
| 2016/0237623 | A1 | 8/2016 | Jaakkola et al. | |
| 2017/0232372 | A1 * | 8/2017 | Zhang | B01D 39/2089 |
| | | | | 55/528 |
| 2017/0312673 | A1 * | 11/2017 | Smith | B01D 46/023 |
| 2018/0028953 | A1 * | 2/2018 | Tanaka | B01D 46/10 |
| 2018/0056219 | A1 | 3/2018 | Yoshida et al. | |
| 2018/0220807 | A1 * | 8/2018 | Honig | D02G 3/443 |
| 2018/0243674 | A1 * | 8/2018 | Gulrez | B01D 39/1623 |
| 2018/0280844 | A1 * | 10/2018 | Shim | B01D 29/07 |
| 2019/0160404 | A1 * | 5/2019 | Smithies | B32B 27/34 |
| 2020/0254372 | A1 * | 8/2020 | Dutkiewicz | B01D 39/18 |

FOREIGN PATENT DOCUMENTS

| | | |
|---|---|---|
| JP | 2005319366 A | 11/2005 |
| WO | 2018/064500 A1 | 4/2018 |

OTHER PUBLICATIONS

Partial European Search Report for European Application No. 20926353.2 mailed Nov. 7, 2022.
International Preliminary Report on Patentability dated Sep. 28, 2021 with the Written Opinion of the International Searching Authority.
Search Report and Written Opinion for corresponding International Application No. PCT/US2020/024876, mailed Jun. 30, 2020.

* cited by examiner

FILTER MEDIA, FILTERS, AND METHODS FOR MAKING THE SAME

CROSS-REFERENCE TO RELATED APPLICATIONS

This application is a U.S. National Phase of International Patent Application No. PCT/US2020/024876, filed on Mar. 26, 2020, which claims priority to U.S. Provisional Application Ser. No. 62/824,030 filed Mar. 26, 2019. The entire contents of these applications are incorporated herein by reference in their entirety.

FIELD OF THE DISCLOSURE

The present disclosure relates generally to filter media and filters.

BACKGROUND

Filters (for example, HVAC filters) can include, for instance, filter media comprising a fiber matrix formed from man-made fibers such as glass fibers and polymer fibers, natural fibers such as cellulosic fibers, cellulosic pulp fibers, wood pulp fibers, and non-wood alternative fibers, and combinations thereof. The filter media can be useful in a variety of fields including, but not limited to, transportation, HVAC, manufacturing, and food processing. Generally, filter media can be evaluated using standard industry tests to evaluate filter performance with respect to certain properties. These properties can include, but are not limited to, filtration efficiency, pressure drop, flammability, particle holding capacity, permeability, and selectivity. Specific fibers can be selected to create a fiber matrix that can achieve desired filtration performance. Improved filter media are desirable, as well as improved filters comprising the filter media described herein. Improved methods of producing filters from the filter media are also described herein.

BRIEF SUMMARY

Briefly described, embodiments of the presently disclosed subject matter generally relate to filter media and filters made therefrom. Disclosed herein are filter media comprising 50% or more of a cellulosic pulp fiber, by weight of the filter media, a bonding material, and 3% or more of a flame-resistant treatment composition, wherein the filter media has a MERV (ed. 2017) rating of 7 or greater. In some embodiments, when the filter media is converted to a filter, the filter meets the flammability requirements defined by UL 900 ($8^{th}$ ed. 2015). In some embodiments, the bonding material comprises a bicomponent fiber and/or a liquid binder. In some embodiments, the flame-resistant treatment composition is selected from citric acid, sodium hypophosphite, or a combination thereof. In some embodiments, the flame-resistant treatment composition is applied to both sides of the filter media. In some embodiments, the filter media comprises 70% or more cellulosic pulp fiber, by weight of the filter media. In some embodiments, the filter media has an initial pressure drop from 0.02 inH$_2$O to 0.45 inH$_2$O. In some embodiments, the filter media has an initial pressure drop from 0.02 inH$_2$O to 0.25 inH$_2$O. In some embodiments, the filter media has an initial pressure drop from 0.25 inH$_2$O to 0.37 inH$_2$O. In some embodiments, the filter media has an initial pressure drop from 0.13 inH$_2$O to 0.25 inH$_2$O. In some embodiments, the filter media has an initial pressure drop from 0.08 inH$_2$O to 0.17 inH$_2$O. In some embodiments, the filter media is biodegradable, recyclable, and/or compostable.

Also disclosed herein are filters comprising filter media comprising 50% or more of a cellulosic pulp fiber, by weight of the filter media, a bonding material, and 3% or more of a flame-resistant treatment composition, wherein the filter produced from the filter media meets the flammability requirements defined by UL 900 ($8^{th}$ ed. 2015). In some embodiments, the filter has a dust-holding capacity of 45 grams to 80 grams for a 20 inch by 20 inch by 2 inch filter. In some embodiments, the filter media can have a basis weight (grammage) of 45 gsm to 150 gsm. In some embodiments, the filter can have a dust-holding capacity of 30 g to 160 g for a 24 inch by 24 inch by 2 inch area filter at an air flow rate of 492 ft/min at a pressure drop of 0.02 inH$_2$O to 1.5 inH$_2$O. In some embodiments, the filter has a MERV ($8^{th}$ ed. 2015) rating of 7 or greater. In some embodiments, the filter has an initial pressure drop of 0.45 in-120 or less.

Also disclosed herein are methods of making and using the filters and filter media.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

FIG. 2a shows a single round of spray drying and heat treatment, while FIG. 2b shows three successive rounds of spray drying and heat treatment.

DETAILED DESCRIPTION

Figure 1:
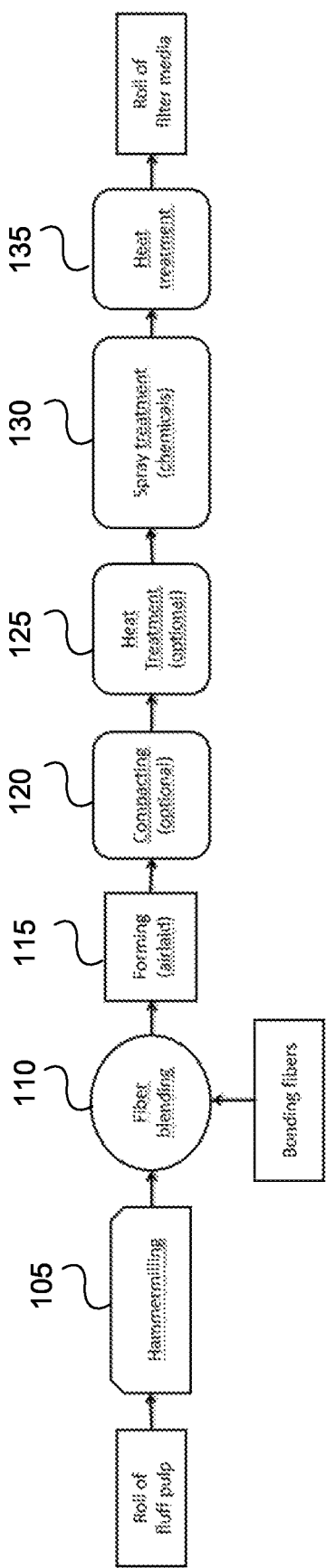
FIG. 1 shows a method for manufacturing filter media according to an embodiment of the disclosure.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms "a," "an," and "the" do not denote a limitation of quantity, but rather denote the presence of "at least one" of the referenced item.

As used herein, the term "and/or" may mean "and," it may mean "or," it may mean "exclusive-or," it may mean "one," it may mean "some, but not all," it may mean "neither," and/or it may mean "both." The term "or" is intended to mean an inclusive "or."

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value. Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Further, the term "about" means within an acceptable error range for the particular value as determined by one of ordinary skill in the art, which will depend in part on how the value is measured or determined, i.e., the limitations of the measurement system. For example, "about" can mean within an acceptable standard deviation, per the practice in the art. Alternatively, "about" can mean a range of up to ±20%, preferably up to ±10%, more preferably up to ±5%, and more preferably still up to ±1% of a given value. Alternatively, particularly with respect to biological systems or processes, the term can mean within an order of magnitude, preferably within 2-fold, of a value. Where particular values are described in the application and claims, unless otherwise stated, the term "about" is implicit and in this context means within an acceptable error range for the particular value. Similarly, the term "substantially" means within an acceptable error range for the particular value as determined by one of ordinary skill in the art, which will depend in part on how the value is measured or determined, i.e., the limitations of the measurement system. For example, "substantially" can mean within an acceptable standard deviation, per the practice in the art. Alternatively, "substantially" can mean a range of up to ±10%, preferably up to ±5%, and more preferably up to ±1% of a given value.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "50 mm" is intended to mean "about 50 mm."

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented. The terms "first," "second," and the like, "primary," "secondary," and the like, do not denote any order, quantity, or importance, but rather are used to distinguish one element from another.

It is noted that terms like "specifically," "preferably," "typically," "generally," and "often" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Disclosed herein are filter media comprising a fibrous material. In some embodiments, the fibrous material comprises natural fibers and/or man-made fibers. In some embodiments, the fibrous material comprises natural fibers. In some embodiments, the fibrous material comprises man-made fibers. In some embodiments, the fibrous material consists of natural fibers. In some embodiments, the fibrous material consists of man-made fibers. In some embodiments, the fibrous material includes cellulosic fibers. In some embodiments, the fibrous material comprises wood fibers. In some embodiments, the wood fibers can be provided in the form of a wood pulp or other fibrous source. For instance, the wood fibers can be provided in the form of southern bleached softwood kraft pulp. For instance, the wood fibers can be provided in the form of thermo-mechanical pulp. For instance, the wood fibers can be provided in the form of northern bleached softwood kraft pulp. Non-limiting examples of fibrous sources can include, but are not limited to, kraft pulp, fluff pulp, dissolving pulp, mechanical pulp, chemical pulp, chemical-mechanical pulp, recovered paper and board pulp (e.g., old corrungated container, old newsprint and mixed office waste), semi-mechanical pulp, semi-chemical pulp, soft cook fully chemical pulp, or any combination thereof. In some embodiments, the fibrous sources can comprise hardwood kraft pulp, softwood kraft (SWK) pulp, southern bleached SWK (SBSK or SBSWK) pulp, northern bleached SWK (NBSK or NBSWK), unbleached softwood kraft (UBSK or UBSWK), BCTMP (bleached chemi-thermomechanical pulp), TMP (thermomechanical pulp), and combinations thereof. Other suitable non-limiting examples of wood fibers include hardwood, softwood, aspen, balsa, beech, birch, mahogany, hickory, maple, oak, teak, eucalyptus, pine, fir, cedar, juniper, spruce, redwood, hemlock, larch or any combination thereof. It is understood that any other known sources of wood fibers may be used. In some embodiments, the filter media can comprise fibrous material in the form of natural non-wood or alternative fibers. Non-limiting examples of natural non-wood fibers that can make up the fibrous material in the filter media can include barley, bagasse, bamboo, wheat, flax, hemp, kenaf, *Arundo donax*, corn stalk, jute, ramie, cotton, wool, rye, rice, papyrus, esparto, sisal, grass, abaca, or a combination thereof. It is understood that the fibrous material can include any other natural fibers from any source or any combination of natural fibers. Other suitable non-limiting examples of fiber sources include consumer waste products such as clothes, tire silk, viscose, rayon, lyocell, or any combination thereof. In some embodiments, the fibrous material can be provided from cellulosic fibers that can be prepared from the wood pulp or otherwise provided fiber source by means of a mechanical process such as hammermilling or other defibration processes. In some embodiments, the fibrous material can comprise fluffy or non-compacted fibers, e.g., the fibrous material can be provided directly from a drying process without being compacted into a bale or roll or being hammermilled. In some embodiments, the fibrous material comprises any combination of natural fibers as disclosed herein.

In some embodiments, the fibrous material can further comprise man-made fibers. In some embodiments, the man-made fibers can include glass fibers, alumina silica fibers, aluminum oxide fibers, silica fibers, carbon fibers, metal fibers, ceramic fibers, aramid fibers, polymer fibers, or any combination thereof. In some embodiments, the fibrous material comprises a man-made fiber to natural fiber ratio of 1:1 to 1:100 (e.g., 1:1.25, 1:5, 1:1.75, 1:2, 1:3, 1:4, 1:5, 1:6, 1:7, 1:8, 1:9, 1:10, 1:20, 1:30, 1:40, 1:50, 1:75, 1:100). The fibrous material can comprise any of the natural fibers disclosed herein in combination with any of the man-made fibers disclosed herein.

The fibrous material can include, by way of non-limiting example, pulp fibers, staple fibers, spun fibers, continuous filament fibers, or a combination thereof. For instance, the fibrous material can comprise natural staple fibers, continuous filament man-made fibers, or a combination thereof. In some embodiments, the fibrous material can comprise fibers having an average length from approximately 0.01 mm to 12 mm. For example, the fibrous material can comprise fibers having an average length of 0.01 mm or greater (e.g., 0.05 mm or greater, 0.10 mm or greater, 0.15 mm or greater, 0.20 mm or greater, 0.25 mm or greater, 0.30 mm or greater, 0.35 mm or greater, 0.40 mm or greater, 0.45 mm or greater, 0.50 mm or greater, 0.55 mm or greater, 0.60 mm or greater, 0.65 mm or greater, 0.70 mm or greater, 0.75 mm or greater, 0.80 mm or greater, 0.85 mm or greater, 0.90 mm or greater, 0.95 mm or greater, 1.0 mm or greater, 1.1 mm or greater, 1.2 mm or greater, 1.3 mm or greater, 1.4 mm or greater, 1.5 mm or greater, 1.6 mm or greater, 1.7 mm or greater, 1.8 mm or greater, 1.9 mm or greater, 2.0 mm or greater, 2.1 mm or greater, 2.2 mm or greater, 2.3 mm or greater, 2.4 mm or greater, 2.5 mm or greater, 2.6 mm or greater, 2.7 mm or greater, 2.8 mm or greater, 2.9 mm or greater, 3.0 mm or greater, 3.5 mm or greater, 4.0 mm or greater, 4.5 mm or greater, 5.0 mm or greater, 5.5 mm or greater, 6.0 mm or greater, 6.5 mm or greater, 7.0 mm or greater, 7.5 mm or greater, 8.0 mm or greater, 8.5 mm or greater, 9.0 mm or greater, 9.5 mm or greater, 10 mm or greater, 10.5 mm or greater, 11 mm or greater, or 11.5 mm or greater). In some embodiments, the fibrous material can comprise fibers having an average length of 12 mm or less (e.g., 11.5 mm or less, 11 mm or less, 10.5 mm or less, 10 mm or less, 9.5 mm or less, 9.0 mm or less, 8.5 mm or less, 8.0 mm or less, 7.5 mm or less, 7.0 mm or less, 6.5 mm or less, 6.0 mm or less, 5.5 mm or less, 5.0 mm or less, 4.5 mm or less, 4.0 mm or less, 3.5 mm or less, 3.0 mm or less, 2.9 mm or less, 2.8 mm or less, 2.7 mm or less, 2.6 mm or less, 2.5 mm or less, 2.4 mm or less, 2.3 mm or less, 2.2 mm or less, 2.1 mm or less, 2.0 mm or less, 1.9 mm or less, 1.8 mm or less, 1.7 mm or less, 1.6 mm or less, 1.5 mm or less 1.4 mm or less, 1.3 mm or less, 1.2 mm or less, 1.1 mm or less, 1.0 mm or less, 0.95 mm or less, 0.90 mm or less, 0.85 mm or less, 0.80 mm or less, 0.75 mm or less, 0.70 mm or less, 0.65 mm or less, 0.60 mm or less, 0.55 mm or less, 0.50 mm or less, 0.45 mm or less, 0.40 mm or less, 0.35 mm or less, 0.30 mm or less, 0.25 mm or less, 0.20 mm or less, 0.15 mm or less, 0.10 mm or less, 0.05 mm or less). In some embodiments, the fibrous material has a length of 0.01 mm to 12 mm (e.g., 0.3 mm to 7 mm, 0.5 mm to 5 mm, 0.7 mm to 2.8 mm, 2.9 mm to 8 mm, 8 mm to 12 mm, 0.01 mm to 1 mm). In some embodiments, the fibrous material has a length of 0.5 mm to 3 mm. In some embodiments, the fibrous material comprises a blend of at least one fiber (natural and/or man-made) that are of different average fiber lengths. In other words, in some embodiments, the fibrous material has bimodal (or trimodal, etc.) fiber length distribution. In some embodiments, the fibrous material has a length of from about 2.0 mm to about 2.8 mm (e.g., for softwood pulp). In some embodiments, the fibrous material has a length of from about 0.8 mm to about 1.2 mm (e.g., for hardwood pulp).

In some embodiments, the fibrous material can comprise fibers having various cross-sectional shapes (e.g., round, scalloped oval, cruciform, haxa-channel, etc.). In some embodiments, the average maximum cross-sectional size of the fibers in the fibrous material (i.e., the average diameter for a round fiber) is from 100 nanometers to 100 microns. In some embodiments, the fibrous material can have an average maximum cross-sectional size of 100 nanometers or greater (e.g., 150 nanometers or greater, 250 nanometers or greater, 350 nanometers or greater, 450 nanometers or greater, 550 nanometers or greater, 650 nanometers or greater, 750 nanometers or greater, 850 nanometers or greater, 950 nanometers or greater, 1 micron or greater, 5 microns or greater, 10 microns or greater, 15 microns or greater, 20 microns or greater, 25 microns or greater, 30 microns or greater, 35 microns or greater, 40 microns or greater, 45 microns or greater, 50 microns or greater, 55 microns or greater, 60 microns or greater, 65 microns or greater, 70 microns or greater, 75 microns or greater, 80 microns or greater, 85 microns or greater, 90 microns or greater, 95 microns or greater). In some embodiments, the fibrous material can have an average maximum cross-sectional size of 100 microns or less (e.g., 95 microns or less, 90 microns or less, 85 microns or less, 80 microns or less, 75 microns or less, 70 microns or less, 65 microns or less, 60 microns or less, 55 microns or less, 50 microns or less, 45 microns or less, 40 microns or less, 35 microns or less, 30 microns or less, 25 microns or less, 20 microns or less, 15 microns or less, 10 microns or less, 5 microns or less, 1 micron or less, 900 nanometers or less, 800 nanometers or less, 700 nanometers or less, 600 nanometers or less, 500 nanometers or less, 400 nanometers or less, 300 nanometers or less, 200 nanometers or less). In some embodiments, the fibrous material can have an average maximum cross-sectional size of 100 nanometers to 100 microns (e.g., 100 nanometers to 1 micron, 1 micron to 10 microns, 10 microns to 25 microns, 25 microns to 50 microns, 50 microns to 75 microns, 75 microns to 100 microns, 25 microns to 75 microns, 25 microns to 100 microns, 100 nanometers to 10 microns, 100 nanometers to 25 microns, 1 micron to 25 microns, 10 microns to 75 microns). In some embodiments, the fibrous material comprises a blend of at least one fiber (natural and/or man-made) that are of different average maximum cross-sectional size. In other words, in some embodiments, the fibrous material has bimodal (or trimodal, etc.) maximum cross-sectional size distribution.

The filter media disclosed herein can further comprise a bonding material. In some embodiments, the bonding material comprises a bonding fiber, alone or in further combination with a liquid binder. In some embodiments, the bonding material comprises a liquid binder. In some embodiments, the bonding fiber comprises a polymer. In some embodiments, the bonding fiber comprises a thermoplastic fiber. In some embodiments, the bonding fiber comprises a biodegradable fiber. The bonding fiber can include, but is not limited to, polyethylene, polyethylene terephthalate, polyester, polypropylene, polyvinyl chloride, polystyrene, polymethacrylate, polyethylene naphthalate, polyvinyl alcohol, polyurethane, polyacrylonitrile, polylactic acid (PLA), polyhydroxyalkanoates (PHA) or any combination thereof.

In some embodiments, the bonding fiber can comprise a monocomponent fiber. In some embodiments, the bonding fiber can comprise a bicomponent fiber. In some embodiments, the bonding fiber can comprise a tricomponent fiber. In some embodiments, the bonding fiber can comprise a mix of monocomponent fibers. In some embodiments, the bonding fiber can comprise a mix of bicomponent fibers. In some embodiments, the bonding fiber can comprise a mix of monocomponent fibers and bicomponent fibers. In some embodiments, the bonding fiber can comprise monocomponent fibers, bicomponent fibers, tricomponent fibers, or a combination thereof. Example bicomponent fiber configurations include, but are not limited to, core-sheath, side-by-side, segmented-pie, islands-in-the-sea, tipped, segmented-ribbon, or a combination thereof. A bicomponent fiber can include a fiber formed from two varieties of a single polymer type and can structurally comprise a core polymer and a sheath polymer. If the core and sheath polymers are varieties of the same polymer, they can retain their polymeric identity but have different melting points, which can render the bicomponent fibers useful as bonding agents. The core and sheath polymers can also comprise separate polymers. A person of ordinary skill in the art would recognize that the melting point of the sheath polymer varies depending on the composition of the sheath polymer, and that the bicomponent fibers can be heated in some embodiments to a temperature sufficient for bonding (e.g., above the melting point of the sheath polymer but below the melting temperature of the core polymer). As discussed in more detail below, the fibrous material and bonding fiber can form at least one layer of airlaid mat (and/or at least one other layer) that can be consolidated at a certain temperature. In some embodiments, the fibrous material, bonding fiber, and liquid binder can be consolidated at a certain temperature. In some embodiments, the fibrous material and the liquid binder can be consolidated at a certain temperature. In some embodiments, the temperature used to consolidate the layer(s) of airlaid mat and/or other layer(s) can depend on the melting temperature of the bonding fiber of the layer(s) of airlaid mat and/or other layer(s).

In some embodiments, the core of the bicomponent fiber can comprise at least one of polyester (which can have a melting temperature of from about 250° C. to about 280° C.), the sheath of the bicomponent fiber can be a polyethylene (which can have a melting temperature of from about 100° C. to about 115° C. for low-density polyethylene and from about 115° C. to about 180° C. for medium- to high-density polyethylene) and/or polypropylene (which can have a melting temperature of from about 130° C. to about 170° C.). In some embodiments, the bicomponent fibers can comprise a core polymer and a sheath polymer. In some embodiments, the core polymer can comprise at least one of a polyester, a polyethylene, and/or a polypropylene. In some embodiments, the core polymer can be selected from the group consisting of a polyester, a polyolefin, a polyethylene, a polypropylene, a polyethylene terephthalate, and a polybutylene terephthalate. In some embodiments, the sheath polymer can comprise at least one of a polyester, a polyolefin, a polyethylene, and/or a polypropylene. In some embodiments, the sheath polymer can be selected from the group consisting of a polyester, a polyethylene, and a polypropylene. In some embodiments, the bicomponent fiber can comprise a polyester core and a polycaprolactone or polylactic acid sheath. In some embodiments, the bicomponent fiber can comprise a polyester core and a polyethylene sheath. In some embodiments, the bicomponent fiber can comprise a polypropylene core and a polyethylene sheath. In some embodiments, the bicomponent fiber can comprise a polyethylene terephthalate core and a polyethylene sheath. In some embodiments, the bicomponent fiber can comprise one or more biodegradable polymers. In some embodiments, the bicomponent fiber can comprise a polylactic acid core and a polybutylene succinate sheath. In some embodiments, the bicomponent fiber can be composed of a core polymer having a higher melting temperature than the sheath polymer. A person of ordinary skill in the art would recognize that any suitable bicomponent fiber, monocomponent fiber, or combination thereof would work in the embodiments disclosed herein and can include any thermoplastic polymer (or combination of thermoplastic polymers). In some embodiments, the bonding fiber is a tricomponent fiber (e.g., core-sheath-sheath). It is to be understood that any variety of polymers can be used in the bonding fiber, with any variety of properties and melting points, and in any configuration (e.g., monocomponent, bicomponent, islands-in-the-sea, etc.) to achieve the desired properties in the resulting filter media or intermediary (e.g., layer of airlaid mat) thereof.

The bonding fiber can be provided in the form including, but not limited to, staple fibers, spun fibers, continuous filament fibers, or a combination thereof. In some embodiments, the bonding fiber has an average length from 0.01 mm to 12 mm. For example, the bonding fiber can have an average length of 0.01 mm or greater (e.g., 0.05 mm or greater, 0.10 mm or greater, 0.15 mm or greater, 0.20 mm or greater, 0.25 mm or greater, 0.30 mm or greater, 0.35 mm or greater, 0.40 mm or greater, 0.45 mm or greater, 0.50 mm or greater, 0.55 mm or greater, 0.60 mm or greater, 0.65 mm or greater, 0.70 mm or greater, 0.75 mm or greater, 0.80 mm or greater, 0.85 mm or greater, 0.90 mm or greater, 0.95 mm or greater, 1.0 mm or greater, 1.1 mm or greater, 1.2 mm or greater, 1.3 mm or greater, 1.4 mm or greater, 1.5 mm or greater, 1.6 mm or greater, 1.7 mm or greater, 1.8 mm or greater, 1.9 mm or greater, 2.0 mm or greater, 2.1 mm or greater, 2.2 mm or greater, 2.3 mm or greater, 2.4 mm or greater, 2.5 mm or greater, 2.6 mm or greater, 2.7 mm or greater, 2.8 mm or greater, 2.9 mm or greater, 3.0 mm or greater, 3.5 mm or greater, 4.0 mm or greater, 4.5 mm or greater, 5.0 mm or greater, 5.5 mm or greater, 6.0 mm or greater, 6.5 mm or greater, 7.0 mm or greater, 7.5 mm or greater, 8.0 mm or greater, 8.5 mm or greater, 9.0 mm or greater, 9.5 mm or greater, 10 mm or greater, 10.5 mm or greater, 11 mm or greater, or 11.5 mm or greater). In some embodiments, the bonding fiber can have an average length of 12 mm or less (e.g., 11.5 mm or less, 11 mm or less, 10.5 mm or less, 10 mm or less, 9.5 mm or less, 9.0 mm or less, 8.5 mm or less, 8.0 mm or less, 7.5 mm or less, 7.0 mm or less, 6.5 mm or less, 6.0 mm or less, 5.5 mm or less, 5.0 mm or less, 4.5 mm or less, 4.0 mm or less, 3.5 mm or less, 3.0 mm or less, 2.9 mm or less, 2.8 mm or less, 2.7 mm or less, 2.6 mm or less, 2.5 mm or less, 2.4 mm or less, 2.3 mm or less, 2.2 mm or less, 2.1 mm or less, 2.0 mm or less, 1.9 mm or less, 1.8 mm or less, 1.7 mm or less, 1.6 mm or less, 1.5 mm or less 1.4 mm or less, 1.3 mm or less, 1.2 mm or less, 1.1 mm or less, 1.0 mm or less, 0.95 mm or less, 0.90 mm or less, 0.85 mm or less, 0.80 mm or less, 0.75 mm or less, 0.70 mm or less, 0.65 mm or less, 0.60 mm or less, 0.55 mm or less, 0.50 mm or less, 0.45 mm or less, 0.40 mm or less, 0.35 mm or less, 0.30 mm or less, 0.25 mm or less, 0.20 mm or less, 0.15 mm or less, 0.10 mm or less, 0.05 mm or less). In some embodiments, the bonding fiber has a length of 0.01 mm to 12 mm (e.g., 0.3 mm to 7 mm, 0.5 mm to 5 mm, 0.7 mm to 2.8 mm, 2.9 mm to 8 mm, 8 mm to 12 mm, 0.01 mm to 1 mm). In some embodiments, the bonding fiber comprises a blend of at least one fibers (e.g., monocomponent fibers and bicomponent fibers, two different bicomponent fibers, two different monocomponent fibers) that are of different average fiber lengths. In other words, in some embodiments, the bonding fiber has bimodal (or trimodal, etc.) fiber length distribution. In some embodiments, the bonding fiber has a length of from about 3 mm to about 12 mm, including about 6 mm.

In some embodiments, the bonding fiber can comprise fibers having various cross-sectional shapes (e.g., round, scalloped oval, cruciform, haxa-channel, etc.). In some embodiments, the average maximum cross-sectional size of the fibers in the bonding fiber (i.e., the average diameter for a round fiber) varies depending on how the bonding fibers are made and can be manipulated to achieve different outcomes for the filter media or any intermediaries (e.g., layer of airlaid mat) thereof. For example, changing the diameter of the bonding fiber can affect the filter strength and filtration performance. Decreasing the diameter of the bonding fiber can increase the strength and filtration efficiency of the filter but could also decrease the permeability (i.e., increase the pressure drop of the filter. In some embodiments, the bonding fiber can comprise fibers of 1 dtex to 10 dtex (e.g., 1.3 dtex to 2.5 dtex, 5 dtex to 7 dtex). In some embodiments, the bonding fiber can comprise fibers of 1 dtex to 5 dtex, including 1.2 dtex, 2 dtex, and 4 dtex. In some embodiments, the bonding fiber can be crimped. In some embodiments, the bonding fiber can be uncrimped.

Any bonding material can be used that would provide the desired properties to the filter media or any intermediary (e.g., layer of airlaid mat). In some embodiments, the bonding material comprises a bonding fiber as discussed herein. In some embodiments, the bonding material comprises a liquid binder. In some embodiments, the bonding material comprises a bonding fiber and a liquid binder. In some embodiments, the bonding material comprises a resin (e.g., phenolic resin). In some embodiments, the resin is applied and dried without water. In some embodiments, the bonding material comprises a latex (e.g., styrene butadiene, acrylic). In some embodiments, the bonding material comprises a thermoplastic binder, wherein the mechanical properties of the thermoplastic binder can change with the temperature. In some embodiments, the bonding material comprises a thermoset binder, wherein the thermoset binder can be applied, dried, and/or heat-treated to become very hard and will no longer substantially change with temperature. Suitable examples of a liquid binder can include, but are not limited to, latex, bio-based latex, styrene butadiene latex, acrylic latex, styrene acrylic, acrylic, polylactic acid, styrene maleic anhydride copolymer, styrene-acrylate copolymer, polyvinyl alcohol, carboxymethyl cellulose, hydroxymethyl cellulose, starch, dextrin, collagen, melamine, or a combination thereof. In some embodiments, the liquid binder can be sprayed onto one or both sides of the filter media or a sheet of airlaid mat. The filter media or sheet can then be heated to dry the filter media or sheet and to enable the liquid binder to bind to the fibers of the filter media as well as to bind the fibers of the filter media together. The temperature and length of heating can depend on the type of liquid binder used, its concentration, and the amount of liquid binder applied to the filter media or airlaid mat. If the filter media or the sheet of airlaid mat further comprises a bonding fiber, the temperature and length of heating can depend on the type of bonding fiber used. For example, if the bonding fiber comprises a bicomponent fiber, the temperature and length of heating can be optimized based on the core and sheath polymers of the bicomponent fiber. Further, the temperature and length of heating can depend on the amount of water or other liquid present in the filter media or airlaid mat that needs to be evaporated prior to further processing steps. A person of ordinary skill in the art would understand how to optimize the heating step in order to dry and/or bond the filter media or sheet of airlaid mat.

In some embodiments, the bonding material comprises a latex comprising polymer particles in an aqueous medium. In some embodiments, the polymer particles have an average particle size of 0.1 micron to 1 micron (e.g., 0.1 micron to 0.2 microns, 0.2 microns to 0.4 microns, 0.4 microns to 0.6 microns, 0.6 microns to 0.8 microns, 0.8 microns to 1 microns). In some embodiments, the polymer particles have an average particle size of 1 micron or less (e.g., 0.95 microns or less, 0.90 microns or less, 0.85 microns or less, 0.80 microns or less, 0.7 microns or less, 0.6 microns or less, 0.5 microns or less, 0.4 microns or less, 0.3 microns or less, 0.2 microns or less, 0.1 microns or less). In some embodiments, the polymer particles have an average particle size of 0.1 micron or greater (e.g., 0.95 microns or greater, 0.90 microns or greater, 0.85 microns or greater, 0.80 microns or greater, 0.7 microns or greater, 0.6 microns or greater, 0.5 microns or greater, 0.4 microns or greater, 0.3 microns or greater, 0.2 microns or greater). In some embodiments, the latex comprises a blend of one or more particles that are of different average particle size. In other words, in some embodiments, the latex has bimodal (or trimodal, etc.) particle size distribution.

In some embodiments, the bonding material comprises only a liquid binder. For example and not limitation, the binder comprises a latex (e.g., styrene butadiene, acrylic). In some embodiments, the binder comprises a thermoplastic binder, wherein the mechanical properties of the thermoplastic binder can change with the temperature. In some embodiments, the binder comprises a thermoset binder, wherein the thermoset binder can be applied, dried, and/or heat-treated to become very hard and will no longer substantially change with temperature. Suitable examples of a liquid binder can include, but are not limited to, latex, bio-based latex, styrene butadiene latex, acrylic latex, styrene acrylic, acrylic, polylactic acid, styrene maleic anhydride copolymer, styrene-acrylate copolymer, polyvinyl alcohol, carboxymethyl cellulose, hydroxymethyl cellulose, starch, dextrin, collagen, melamine, or a combination thereof. In some embodiments, the liquid binder can be sprayed onto one or both sides of the filter media or a sheet of airlaid mat. The temperature and length of heating can depend on the type of liquid binder used, its concentration, and the amount of liquid binder applied to the filter media or airlaid mat. If the filter media or the sheet of airlaid mat further comprises a bonding fiber, the temperature and length of heating can depend on the type of bonding fiber used. For example, if the bonding fiber comprises a bicomponent fiber, the temperature and length of heating can be optimized based on the core and sheath polymers of the bicomponent fiber. Further, the temperature and length of heating can depend on the amount of water or other liquid present in the filter media or airlaid mat that needs to be evaporated prior to further processing steps. A person of ordinary skill in the art would understand how to optimize the heating step in order to dry and/or bond the filter media or sheet of airlaid mat.

The filter media disclosed herein can comprise a flame-resistant treatment composition. The flame-resistant treatment composition can confer fire-resistant or flame-resistant properties to a material that comprises or is treated with the composition. In some embodiments, to improve the fire-resistant properties of the filter media, the filter media can be impregnated with a resin or other flame-resistant treatment composition. In some embodiments, the filter media can be coated with or sprayed with the flame-resistant treatment composition. As used herein, "flame-resistant" and "fire-resistant" can be used to describe a material that is able to slow or stop the spread of fire or reduce its intensity. Non-limiting examples of a flame-resistant treatment composition can include ammonium phosphate, aromatic phosphates, tricresyl phosphate, dimethoxy ethyl phthalate, diethoxy ethyl phthalate, triethylene glycol, di-2-ethyl butyrate, dibutyl tartrate, diammonium phosphate, sodium borophosphate, borax, boric acid, sodium phosphate dodecahydrate, ammonium sulfamate, ammonium sulfate, ammonium bromide, sodium phosphate, sodium tungstate dihydrate, sodium hypophosphite, citric acid, maleic acid, carboxylic acid, or any combinations thereof. In some embodiments, the flame-resistant treatment composition can include borax and boric acid, sodium hypophosphite and citric acid, boric acid and diammonium phosphate, sodium dodecahydrate and boric acid, or any combination thereof. In some embodiments, the flame-resistant treatment composition can be a mixture of citric acid and a catalyst, such as for example and not limitation, sodium hypophosphite. In some embodiments, the flame-resistant treatment composition can comprise citric acid. In some embodiments, the flame-resistant treatment composition can comprise a hypophosphite such as sodium hypophosphite. In some embodiments, the flame-resistant treatment composition can comprise 7.5% w/w of citric acid and catalyst relative to the weight of the filter media (e.g., a 100 gsm filter media can be treated with 7.5 grams of the chemicals on a dry basis on at least one side). In some embodiments, the filter media can be treated with the flame-resistant treatment composition on one side. In some embodiments, the filter media can be treated with the flame-resistant treatment compositions on more than one side. If the filter media is treated on more than one side, less of the flame-resistant treatment media can be used. For example, two sides of the filter media can each be treated with 4% w/w of the flame-resistant treatment composition (total 8% w/w of the flame-resistant treatment composition). In some embodiments, two sides of the filter media can each be treated with 7.5% w/w of the flame-resistant treatment composition (total 15% w/w of the flame-resistant treatment composition. In some embodiments, two sides of the filter media can each be treated with 3% w/w to 7.5% w/w of the flame-resistant treatment composition (total 6% w/w to 15% w/w of the flame-resistant treatment composition. In some embodiments, one side of the filter media can be treated with 3% w/w to 7.5% w/w of the flame-resistant treatment composition. In some embodiments, the flame-resistant treatment composition can be any substance that is non-flammable and/or has no flash point. In some embodiments, application of the flame-resistant treatment composition enables the filter to pass the UL 900 test for flammability.

In some embodiments, the flame-resistant treatment composition can be applied to the filter media or any intermediary (e.g., layer of airlaid mat) by a coating process. Non-limiting examples of a coating process can include vapor deposition, chemical vapor deposition, physical vapor deposition, ion plating, vacuum deposition, conversion coating, atomizing, spraying, thermal spraying, powder coating, air knife coating, gap coating, roller coating, curtain coating, slide coating, spin coating, dip coating, metering size press, or a combination thereof. In some embodiments, the flame-resistant treatment composition can be applied to the filter media or any intermediary (e.g., layer of airlaid mat) by a liquid impregnation process (e.g., impregnation bath). The filter media disclosed herein can comprise a fibrous material, a bonding material, a flame-resistant treatment composition, or a combination thereof. The filter media can comprise the fibrous material in any suitable amount to confer a desirable property to the filter media and/or any intermediaries (e.g., layer of airlaid mat). In some embodiments, the fibrous material can be present in the filter media in amounts of 50% or greater (e.g., 55% or greater, 60% or greater, 65% or greater, 70% or greater, 75% or greater, 80% or greater, 81% or greater, 82% or greater, 83% or greater, 84% or greater, 85% or greater, 86% or greater, 87% or greater, 88% or greater, 89% or greater, 90% or greater, 91% or greater, 92% or greater, 93% or greater, 94% or greater, 95% or greater, 96% or greater, 97% or greater, 98% or greater) by weight, based on the total weight of the filter media. In some embodiments, the fibrous material can be present in the filter media in amounts of 99% or less (e.g., 98% or less, 97% or less, 96% or less, 95% or less, 94% or less, 93% or less, 92% or less, 91% or less, 90% or less, 89% or less, 88% or less, 87% or less, 86% or less, 85% or less, 84% or less, 83% or less, 82% or less, or 81% or less, 80% or less, 75% or less, 70% or less, 65% or less, 60% or less, 55% or less), by weight, based on the total weight of the filter media. In some embodiments, the filter media can comprise 70% to 95% fibrous material by weight based on the total weight of the filter media.

The filter media can comprise the bonding fiber in any suitable amount to confer a desirable property to the filter media and/or any intermediaries (e.g., layer of airlaid mat). In some embodiments, the filter media comprises no bonding fiber. In some embodiments, the bonding fiber can be present in the filter media in an amount of 1% to 50%, by weight of the filter media. In some embodiments, the bonding fiber is present in an amount of 1% or greater (e.g., 2% or greater, 4% or greater 6% or greater, 8% or greater, 10% or greater, 15% or greater, 20% or greater, 25% or greater, 30% or greater, 35% or greater, 40% or greater, 45% or greater) by weight, based on the total weight of the filter media. In some embodiments, the bonding fiber can be present in the filter media in amounts of 50% or less (e.g., 45% or less, 40% or less, 35% or less, 30% or less, 25% or less, 20% or less, 15% or less, 10% or less, 8% or less, 6% or less, 4% or less, 2% or less) by weight, based on the total weight of the filter media. In some embodiments, the bonding fiber is present in the filter media in an amount of 1% to 50% (e.g., 1% to 10%, 5% to 15%, 10% to 20%, 20% to 30%, 30% to 40%, 40% to 50%, 1% to 20%, 1% to 25%, 5% to 25%, 1% to 30%, 40% to 50%) by weight, based on the total weight of the filter media. In some embodiments, the bonding fiber is present in the filter media in an amount of 5% to 30% by weight, based on the total weight of the filter media. In some embodiments, the bonding fiber is present in the filter media in an amount of 5% to 15% by weight based on the total weight of the filter media. In some embodiments which have bonding fiber in combination with a liquid binder, the bonding fiber can be present in a lower amount, such as less than 10% by weight based on the total weight of the filter media, preferably between 3% to 7% by weight.

The flame-resistant treatment composition in the filter media can be present in any suitable amount to confer a desirable property to the filter, filter media, and/or any intermediaries (e.g., layer of airlaid mat). In some embodiments, the flame-resistant treatment composition can be present in the filter media in amounts of 15% or less (e.g., 14.5% or less, 14% or less, 13.5% or less, 13% or less, 12.5% or less, 12% or less, 11.5% or less, 11% or less, 10.5% or less, 10% or less, 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, 1.5% or less, 1% or less, or 0.5% or less) by weight, based on the total weight of the filter media. In some embodiments, the flame-resistant treatment composition can be present in the filter media in amounts of 1% or greater (e.g., 1.5% or greater, 2% or greater, 2.5% or greater, 3% or greater, 3.5% or greater, 4% or greater, 4.5% or greater, 5% or greater, 5.5% or greater, 6% or greater, 6.5% or greater, 7% or greater, 7.5% or greater, 8% or greater, 8.5% or greater, 9% or greater, 9.5% or greater, 10% or greater, 10.5% or greater, 11% or greater, 11.5% or greater, 12% or greater, 12.5% or greater, 13% or greater, 13.5% or greater, 14% or greater, or 14.5% or greater) by weight, based on the total weight of the filter media. In some embodiments, the flame-resistant treatment composition is present in the filter media in an amount of 1% to 15% (e.g., 1% to 10%, 10% to 15%, 1% to 2%, 2% to 15%, 1% to 13%, 1% to 4%, 4% to 15%, 1% to 5%, 6% to 15%, 1% to 6%, 1% to 7%, 8% to 15%, 1% to 8%, 1% to 9%, 2% to 10%, 3% to 10%, 4% to 10%, 5% to 10%, 6% to 10%, 7% to 10%, 8% to 10%, 9% to 10%, 2% to 6%, 3% to 6%, 4% to 6%, 5% to 6%, 2% to 5%, 3% to 5%, 4% to 5%, 8% to 12%, or 12% to 15%) by weight, based on the total weight of the filter media. In some embodiments, the flame-resistant treatment material is present in the filter media in an amount of 6% to 15% by weight, based on the total weight of the filter media.

Figure 2A:
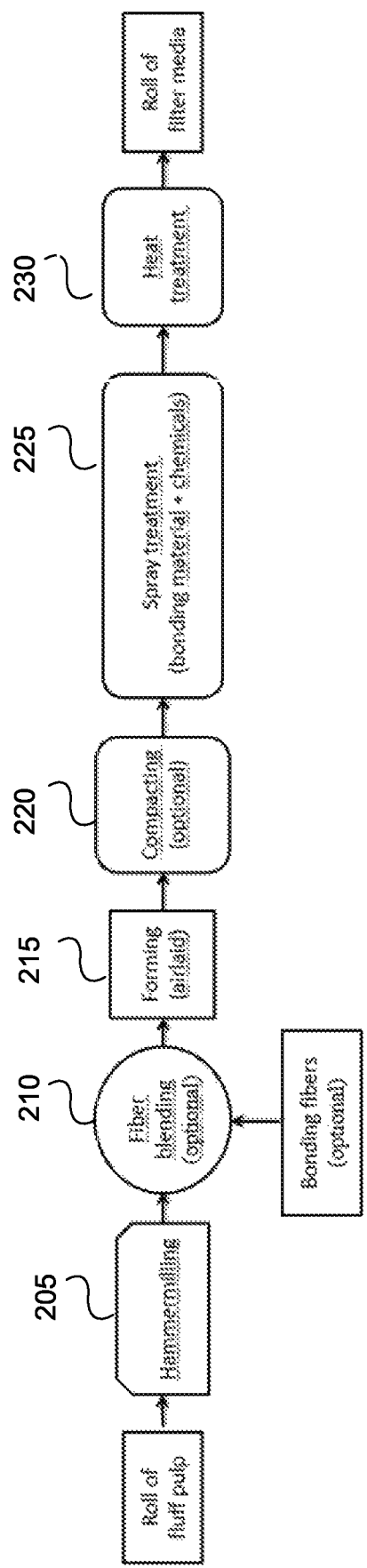
FIG. 2a-2b show alternative methods for manufacturing filter media according to another embodiment of the present disclosure, where there is an alternative order of spray treatment and heat treatment. Specifically.
Figure 2B:
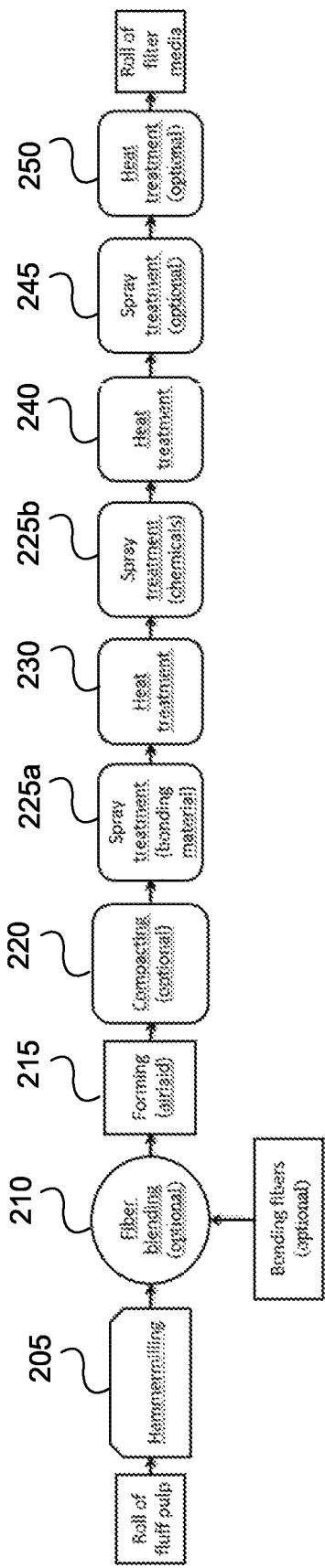
Figure 3:
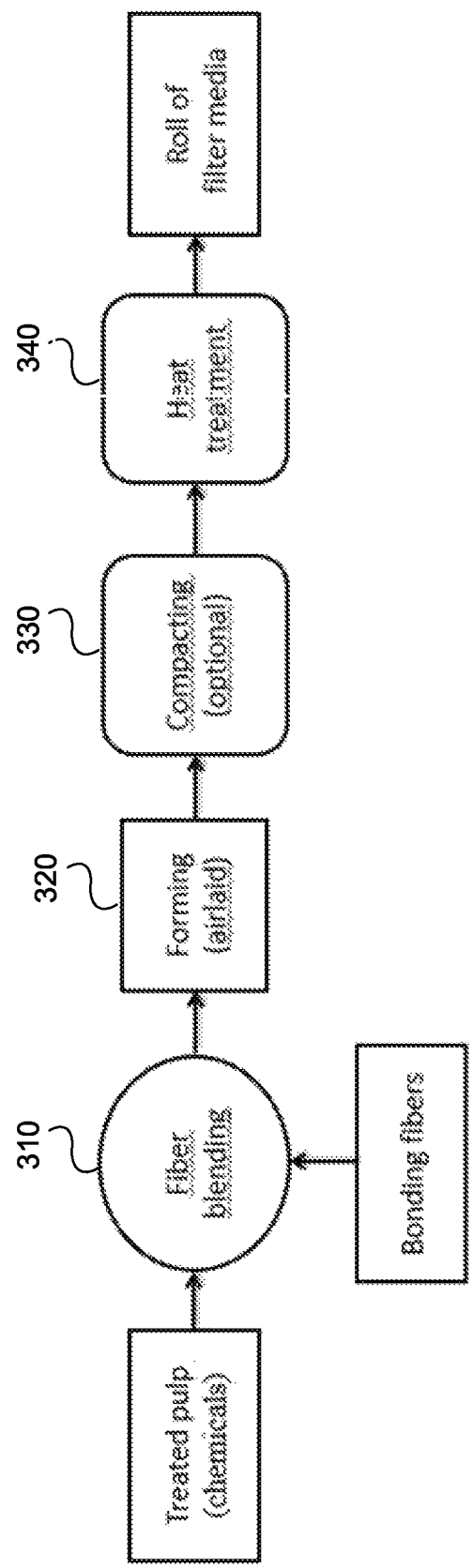
FIG. 3 shows a method for manufacturing filter media according to another embodiment of the present disclosure.
Figure 4:
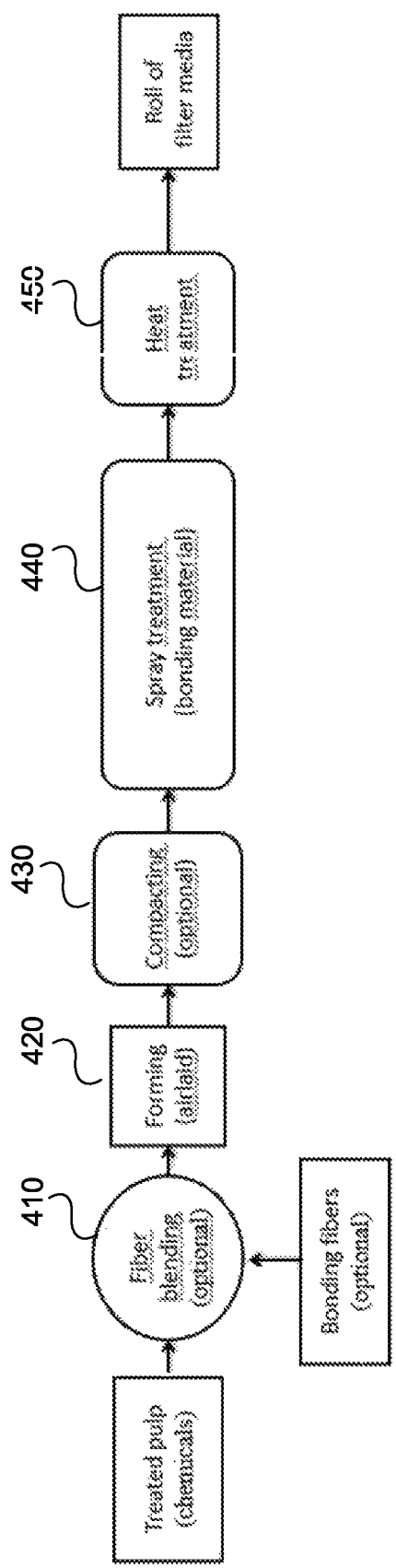
FIG. 4 shows a method for manufacturing filter media according to another embodiment of the present disclosure.

FIGS. 1-4 show exemplary embodiments of manufacturing filter media according to the present disclosure. The process steps can be represented graphically as a series of steps that, in the embodiments disclosed in FIGS. 1-4, can include for instance, a roll of pulp or treated pulp in the form of loose fibrous material (e.g., treated to be flame resistant). FIG. 1, for instance, discloses an embodiment for manufacturing filter media via thermal bonding untreated fibrous material (e.g., roll of pulp). FIG. 2a-2b, for instance, disclose an embodiment for manufacturing filter media via bonding with a bonding material (e.g., a liquid bonding material such as resin or latex) an untreated fibrous material (e.g., roll of pulp). FIG. 3, for instance, discloses an embodiment for manufacturing filter media via thermal bonding treated fibrous material (e.g., treated wood pulp). FIG. 4, for instance, discloses an embodiment for manufacturing filter media via bonding fibrous material (e.g., treated wood pulp). A person of ordinary skill in the art would understand that some or all process steps can have some or all features discussed above regarding the component parts. In some embodiments, the method can comprise forming the fibrous material, optionally compressing or compacting the fibrous material, bonding the fibrous material to form a filter media, treating the filter media with chemicals, heating and/or drying the filter media, and optionally compressing and heating the filter media. In some embodiments, for example when the fibrous material is cellulosic fiber and the bonding material is a bicomponent fiber, the fibrous material and bonding material can be bonded, treated, and heated and/or dried simultaneously. In some embodiments, for example when the fibrous material is cellulosic fiber and the bonding material is a liquid binder such as latex, the fibrous material and the bonding material can be bonded first and the treatment and heating and/or drying steps can be simultaneous. In some embodiments, the filter media can undergo multiple successive rounds of treatment and heating and/or drying. In some embodiments, the finished filter media can undergo a final compression with heating.

In FIG. 1, a roll of pulp, which is an exemplary fibrous material, can be defibered (e.g., via hammermilling 105).

The defibered fluff pulp exiting hammermilling 105 can undergo fiber blending 110 with a bonding material. The blended fibers exiting fiber blending 110 can undergo forming 115 of a layer (e.g., an airlaid mat layer). For example, the forming 115 can be done by one or more forming heads. If more than one forming head is used, each forming head can have the same fiber blend or a different fiber blend (e.g., a natural fiber blend or a man-made fiber blend, or a first head can have one type of natural fiber and a second head can have a different type of natural fiber). The conditions of the forming step (e.g., rate of mat formation) can be optimized based on the general knowledge of one of ordinary skill in the art. The formed layer exiting the forming step 115 can then undergo optional compaction 120 by a roller that can be heated (e.g., to 90° C. to 110° C.), and nipped with a backing roller, optional heat treatment 125, spray treatment 130 (e.g., spray treatment for flame resistance), and/or a heat treatment 135 to produce a roll of filter media. The compacting roller can optionally be engraved. Additional bonding fibers can be added in the fiber blending step 110 before the forming process which can produce a fiber media comprising a bonding material and a binder (e.g., the bonding material can comprise bicomponent fibers and the binder can comprise a polymer such as latex). The conditions used in the spray treatment as well as the specific treatment used can depend on the selected chemical and its concentration. The temperature used in the heat treatment(s) can depend on the chemical added during the spray treatment as well as the concentration of the chemical. The time of the heat treatment(s) can also depend on the chemical added during the spray treatment and its concentration. Further, the temperature and time of the heat treatment can be optimized based on the bonding material in order to bond the layer. For example, the time and temperature can be selected based on the specific type of bonding material, e.g., the sheath and core polymers of a bicomponent fiber can be used to determine the heating conditions, or the type and concentration of liquid binder can be used to determine the heating conditions. The temperature and time of the heat treatment can also be optimized based on the amount of water or aqueous solution that needs to be evaporated from the filter media. The pressure applied by the compacting roller in optional compaction step 120 or in the optional final compaction step can be optimized based on, for example and not limitation, the desired decrease in caliper of the mat. The pressure applied by the compacting roller can be in addition to the pressure applied by the weight of the roller itself.

In FIG. 2a, a roll of pulp can be defibered (e.g., via hammermilling 205). The defibered fluff pulp exiting hammermilling 205 can undergo optional fiber blending 210 and forming 215 of a layer (e.g., an airlaid mat layer). For example, the forming 215 can be done by one or more forming heads. If more than one forming head is used, each forming head can have the same fiber blend or a different fiber blend (e.g., a natural fiber blend or a man-made fiber blend, or a first head can have one type of natural fiber and a second head can have a different type of natural fiber). The conditions of the forming step (e.g., rate of mat formation) can be optimized based on the general knowledge of one of ordinary skill in the art. The formed layer exiting the forming step 215 can then undergo optional compaction 220 by a roller that can be heated (e.g., to 90° C. to 110° C.), and nipped with a backing roller. The layer can then undergo spray treatment 225 (e.g., spray treatment of flame-resistant treatment composition and/or a bonding material) and heat treatment 230 to produce a roll of filter media. The compacting roller can optionally be engraved. The conditions used in the spray treatment as well as the specific treatment used can depend on the selected chemical and its concentration. The temperature used in the heat treatment(s) can depend on the chemical added during the spray treatment and its concentration. The time of the heat treatment(s) can also depend on the chemical added during the spray treatment and its concentration. Further, the temperature and time of the heat treatment can be optimized based on the bonding material in order to bond the layer. For example, the time and temperature can be selected based on the specific type of bonding material, e.g., the sheath and core polymers of a bicomponent fiber can be used to determine the heating conditions, or the type and concentration of liquid binder can be used to determine the heating conditions. The temperature and time of the heat treatment(s) can also be optimized based on the amount of water or aqueous solution that needs to be evaporated from the filter media. The pressure applied by the compacting roller in optional compaction step 220 or in an optional final compaction step can be optimized based on, for example and not limitation, the desired decrease in caliper of the mat. The pressure applied by the compacting roller can be in addition to the weight of the roller itself.

In FIG. 2b, a roll of pulp can be defibered (e.g., via hammermilling 205). The defibered fluff pulp exiting hammermilling 205 can undergo optional fiber blending 210 and forming 215 of a layer (e.g., an airlaid mat layer). For example, the forming 215 can be done by one or more forming heads. If more than one forming head is used, each forming head can have the same fiber blend or a different fiber blend (e.g., a natural fiber blend or a man-made fiber blend, or a first head can have one type of natural fiber and a second head can have a different type of natural fiber). The conditions of the forming step (e.g., rate of mat formation) can be optimized based on the general knowledge of one of ordinary skill in the art. The formed layer exiting the forming step 215 can then undergo optional compaction 220 by a roller that can be heated (e.g., 90° C. to 110° C.), and nipped with a backing roller. The compacting roller can optionally be engraved. The layer can then undergo spray treatment of bonding material 225a and heat treatment 230. The layer can then undergo spray treatment 225b of chemicals such as a flame-resistant treatment composition and a heat treatment 240. Optionally, the layer can undergo a final spray treatment 245 and heat treatment 250 to form a roll of filter media. The bonding material and chemicals can be added to one or both surfaces of the layer simultaneously or they can be added to either surface of the layer in separate spray treatments. In other words, the formed layer can undergo one or more rounds of spray treatment and heat treatment in order to apply a desired additive or other treatment to one or both sides of the formed layer, followed by a heat treatment. The conditions used in the spray treatment as well as the specific treatment used can depend on the selected chemical and its concentration. The temperature used in the heat treatment(s) can depend on the chemical added during the spray treatment and its concentration. The time of the heat treatment(s) can also depend on the chemical added during the spray treatment and its concentration. Further, the temperature and time of the heat treatment can be optimized based on the bonding material in order to bond the layer. For example, the time and temperature can be selected based on the specific type of bonding material, e.g., the sheath and core polymers of a bicomponent fiber can be used to determine the heating conditions, or the type and concentration of liquid binder can be used to determine the heating conditions. The temperature and time of the heat treatment(s) can also be optimized based on the amount of water or aqueous solution that needs to be evaporated from the filter media. The pressure applied by the compacting roller in optional compaction step 220 or in an optional final compaction step can be optimized based on, for example and not limitation, the desired decrease in caliper of the mat. The pressure applied by the compacting roller can be in addition to the weight of the roller itself.

For example, the defibered fluff pulp exiting hammermilling 205 can undergo one or more of a spray treatment (e.g., a binder for bonding the fibers together), a heat treatment (e.g., to activate the binder), a second spray treatment (e.g., to apply chemicals on a first side of the defibered fluff pulp), a second heat treatment (e.g., to dry and/or activate the chemicals applied to the first side of the defibered fluff pulp), a third spray treatment (e.g., to apply chemicals to a second side of the defibered fluff pulp), and a third heat treatment (e.g., to dry and/or activate the chemicals applied to the second side of the defibered fluff pulp). The conditions of the heat treatment(s) can be optimized depending on the type and concentration of the chemical(s) applied to the defibered fluff pulp, as well as the bonding fibers used and the amount of water or liquid binder to be evaporated before continuing processing. Additional bonding fibers can be added in the fiber blending step 210 before the forming process which can produce a fiber media comprising a bonding material and a liquid binder (e.g., the bonding material can comprise bicomponent fibers and the binder can comprise a polymer such as latex).

In FIG. 3, treated pulp in the form of loose fibrous material can undergo fiber blending 310 with a bonding material (e.g., bicomponent fibers and/or a liquid binder). The blended fibers exiting fiber blending 310 can undergo forming 320 of a layer (e.g., an airlaid mat layer). For example, the forming step 320 can be done by one or more forming heads. If more than one forming head is used, each forming head can have the same fiber blend or a different fiber blend (e.g., a natural fiber blend or a man-made fiber blend, or a first head can have one type of natural fiber and a second head can have a different type of natural fiber). The conditions of the forming step (e.g., rate of mat formation) can be optimized based on the general knowledge of one of ordinary skill in the art. The formed layer exiting the forming step 320 can then undergo optional compaction 330 by a roller that can be heated (e.g., to 90° C. to 110° C.), and then nipped with a backing roller. The compacting roller can optionally be engraved. The layer can then undergo a heat treatment 340 to produce a roll of filter media. In some embodiments, the treated pulp is pulp chemically treated (e.g., with a flame-resistant treatment composition). In some embodiments, the treated pulp is mechanically treated (e.g., curled or crimped). In some embodiments, the treated pulp is chemically and mechanically treated. In some embodiments, the treated pulp comprises the treated kraft pulp disclosed in U.S. Patent Application Publication No. 2016/0289895 A1, which is incorporated by reference in its entirety herein. The bonding material and chemicals can be added to one or both surfaces of the layer simultaneously or they can be added to either surface of the layer in separate spray treatments. In other words, the formed layer can undergo one or more rounds of spray treatment and heat treatment in order to apply a desired additive or other treatment to one or both sides of the formed layer, followed by a heat treatment. The conditions used in the spray treatment as well as the specific treatment used can depend on the selected chemical and its concentration. The temperature used in the heat treatment(s) can depend on the chemical added during the spray treatment and its concentration. The time of the heat treatment(s) can also depend on the chemical added during the spray treatment and its concentration. Further, the temperature and time of the heat treatment can be optimized based on the bonding material in order to bond the layer. For example, the time and temperature can be selected based on the specific type of bonding material, e.g., the sheath and core polymers of a bicomponent fiber can be used to determine the heating conditions, or the type and concentration of liquid binder can be used to determine the heating conditions. The temperature and time of the heat treatment can also be optimized based on the amount of water or aqueous solution that needs to be evaporated from the filter media. The pressure applied by the compacting roller in optional compaction step 330 or in an optional final compaction step can be optimized based on, for example and not limitation, the desired decrease in caliper of the mat. The pressure applied by the compacting roller can be in addition to the weight of the roller itself.

In FIG. 4, treated pulp in the form of loose fibrous material (e.g., pulp treated with a flame-resistant material) can undergo optional fiber blending 410 and forming 420 of a layer (e.g., an airlaid mat layer). For example, the forming 420 can be done by one or more forming heads. If more than one forming head is used, each forming head can have the same fiber blend or a different fiber blend (e.g., a natural fiber blend or a man-made fiber blend, or a first head can have one type of natural fiber and a second head can have a different type of natural fiber). The conditions of the forming step (e.g., rate of mat formation) can be optimized based on the general knowledge of one of ordinary skill in the art. The formed layer exiting forming step 420 can then undergo optional compaction 430 by a roller that can be heated (e.g., to 90° C. to 110° C.), and nipped with a backing roller. The compacting roller can optionally be engraved. The layer can then undergo at least one spray treatment 440 (e.g., spray treatment of a bonding material) and at least one heat treatment 450 to produce a roll of filter media. The bonding material and chemicals can be added to one or both surfaces of the layer simultaneously or they can be added to either surface of the layer in separate spray treatments. The conditions used in the spray treatment as well as the specific treatment used can depend on the selected chemical and its concentration. The temperature used in the heat treatment(s) can depend on the chemical added during the spray treatment and its concentration. The time of the heat treatment(s) can also depend on the chemical added during the spray treatment and its concentration. Further, the temperature and time of the heat treatment can be optimized based on the bonding material in order to bond the layer. For example, the time and temperature can be selected based on the specific type of bonding material, e.g., the sheath and core polymers of a bicomponent fiber can be used to determine the heating conditions, or the type and concentration of liquid binder can be used to determine the heating conditions. The temperature and time of the heat treatment can also be optimized based on the amount of water or aqueous solution that needs to be evaporated from the filter media. The pressure applied by the compacting roller in optional compaction step 430 or in an optional final compaction step can be optimized based on, for example and not limitation, the desired decrease in caliper of the mat. The pressure applied by the compacting roller can be in addition to the weight of the roller itself.

In some embodiments, the fibrous material (e.g., the roll of pulp of FIGS. 1-2a-2b) can undergo a defibration process 105 and 205. For example, the fibrous material can be hammermilled. As would be appreciated by one of ordinary skill in the art, the defibration process can better prepare the fibrous material to be formed into a layer and allow for better control over fibrous material parameters such as fiber length, and knot content. Nonlimiting examples of a defibration process can include hammermilling, grinding, and/or crushing. In some embodiments, the fibrous material is already defibered and does not need to undergo the defibration process 105 or 205. In still other embodiments, the fibrous material is provided in a fluffy or noncompacted form, e.g., is provided directly from a drying process and is not compacted into a roll or bale, and does not undergo the defibration process 105 or 205.

Fiber blending steps 110, 210, 310, 410 can include, for instance, any method of combining fibrous material, including natural and/or man-made fibers, in any combination (defibered or otherwise), with another substance including, but not limited to, bonding material. Nonlimiting fiber blending processes include, but are not limited to, manual blending, mechanical blending, stirring, or combinations thereof.

Forming steps 115, 215, 320, 420 can be, for instance, an airlaid process to produce a layer of airlaid mat. In embodiments where the layer is an airlaid mat, for instance, it can be formed in forming 115, 215, 320, 420 using any device known in the art that can form an airlaid mat, such as for example and not limitation a drumformer or a spike former, under conditions that can be optimized by one of skill in the art. Those skilled in the art would understand that an airlaid mat layer can be formed by a device generally including a fiber feed for providing the fibrous material, a hammermill (e.g., a defibering process), at least one forming head for receiving the defibrated fibrous material and bonding fibers to form a web of the fibrous material, and a conveyor on which the web of fibrous material is formed and compacted into a mat. In some embodiments, the airlaid mat layer can be formed from a fibrous material that has already been defibered and thus does not need to undergo a defibering process. In some embodiments, the airlaid mat layer can be formed from a fluffy or uncompacted fibrous material, e.g., one that has not been compacted into a bale or roll. In some embodiments, the mat can be initially compacted by applying a vacuum in the forming head pulling from under the forming wire. The degree of initial compaction can be affected by adjusting the level of the vacuum in the forming head. Additional optional compaction 120, 220, 330, 430 of the mat can be performed after forming by the roller discussed above, which can optionally be engraved and/or heated (e.g., to 90° C. to 110° C.). The pressure applied by the roller can be optimized based on, for example and not limitation, the desired decrease in caliper of the airlaid mat. In some embodiments, the caliper of the mat can be decreased by about 10% to about 50%. In some embodiments, the compaction step can be performed later in the process, e.g., to the final airlaid mat. The pressure applied by the compacting roller can be in addition to the weight of the roller itself.

In some embodiments, the forming 115, 215, 320, 420 can be done by one or more forming heads. If more than one forming head is used, each forming head can have the same fiber blend or a different fiber blend (e.g., a natural fiber blend or a man-made fiber blend, or a first head can have one type of natural fiber and a second head can have a different type of natural fiber). Before, after or during forming the fibrous material, the fibrous materials can be surface treated (e.g., in one or more spray treatment steps 130, 225, 225a, 225b, 245, and/or 440), optionally followed by one or more heat treatment(s) 125, 135, 230, 240, 250, 450. In some embodiments, the surface treatment includes spray treating the fibrous material with a bonding material, a flame-resistant treating composition, or a combination thereof. In some embodiments, the fibrous materials are surface treated to improve the chemical and/or mechanical properties of the fibrous materials or resulting layers and filter media. The fibrous materials can be surface treated using chemical and/or physical surface treatments. In some embodiments, the surface treatment includes adhesive treatment, adding/removing static charges between fibers, electric discharge, mercerization, graft copolymerization, peroxide treatment, vinyl grafting, bleaching, acetylation, coupling-agent treatment, isocyanate treatment, addition of colorants, or combinations thereof. In some embodiments, the fibrous materials are surface treated to increase the bonding between the fibrous material and bonding fiber, provide water resistance to the fibers, decrease static between fibers, change the physical appearance of the fibers, and various other property enhancements known to those of ordinary skill in the art. The conditions of the surface treatment(s) are selected based on the specific composition being applied to the fibrous materials and/or its concentration. The conditions of the heat treatment(s) are also selected based on the specific composition being applied to the fibrous materials and/or its concentration.

In some embodiments, the finished airlaid mat or filter media undergoes an optional final compaction step and is simultaneously heated (e.g., indirectly or by the compaction mechanism). The pressure applied during this optional compaction step can be optimized based on, for example and not limitation, the desired decrease in caliper of the airlaid mat. In some embodiments, the caliper of the mat can be decreased by about 10% to about 50%.

In some embodiments, the filter and/or filter media comprises at least one layer of airlaid mat and further comprises at least one other layer. In some embodiments the other layer can include a wetlaid mat layer, spunbond mat layer, meltblown mat layer, or a combination thereof. The other layer can be formed by any process known to a person of ordinary skill in the art. The airlaid mat layer(s) and other layer(s) can be combined in any way known in the art (e.g., compression, adhesive use, etc.). For instance, in some embodiments the filter can comprise 1 layer, 2 layers, 3 layers, or 4 layers of airlaid mat and/or other layers. It is understood that, depending on the use, the number of layers can exceed 6 layers. In some embodiments, the layers can be laminated together or otherwise joined. In some embodiments, the layer (e.g., layer of airlaid mat) can be formed on top of a pre-existing layer (e.g., another airlaid mat layer, a wetlaid mat layer, spunbond mat layer, meltblown mat layer, or combination thereof) directly on the forming line. In some embodiments, the layers differ from one another. In some embodiments, the layers can include at least one airlaid mat layer and at least one wetlaid mat layer. In some embodiments, the layers can include at least one airlaid mat layer and at least one spunbond mat layer. In some embodiments, the layers can include at least one airlaid mat layer and at least one meltblown mat layer. In some embodiments, the layers can include at least one airlaid mat layer, at least one meltblown mat layer, and at least one spunbond layer. In some embodiments, the layers can include multiple different airlaid mat layers. In some embodiments, the layers can include a sandwich structure of layers, for instance with multiple different airlaid mat layers outside and at least one other layer inside. In some embodiments, the layers can include a sandwich structure of layers, for instance with multiple different other layers outside and at least one airlaid mat layer inside. In some embodiments, the airlaid mat layer or other layer can each independently have a weight of 10 gsm (grams per square meter) to 200 gsm, as measured by PAPTAC Standard D.3 (2011). For instance, the airlaid mat layer or other layer can each independently have a weight of 10 gsm or greater (e.g., 20 gsm or greater, 30 gsm or greater, 40 gsm or greater, 50 gsm or greater, 60 gsm or greater, 70 gsm or greater, 80 gsm or greater, 90 gsm or greater, 100 gsm or greater, 110 gsm or greater, 120 gsm or greater, 130 gsm or greater, 140 gsm or greater, 150 gsm or greater, 160 gsm or greater, 170 gsm or greater, 180 gsm or greater, or 190 gsm or greater). For instance, the airlaid mat layer or other layer can each independently have a weight of 200 gsm or less (e.g., 20 gsm or less, 30 gsm or less, 40 gsm or less, 50 gsm or less, 60 gsm or less, 70 gsm or less, 80 gsm or less, 90 gsm or less, 100 gsm or less, 110 gsm or less, 120 gsm or less, 130 gsm or less, 140 gsm or less, 150 gsm or less, 160 gsm or less, 170 gsm or less, 180 gsm or less, or 190 gsm or less). For instance, the airlaid mat layer or other layer can each independently have a weight of from 10 gsm to 200 gsm (e.g., 10 gsm to 40 gsm, 40 gsm to 100 gsm, 60 gsm to 120 gsm, 65 gsm to 95 gsm, 75 gsm to 85 gsm, 80 gsm to 90 gsm, 90 gsm to 100 gsm, 10 gsm to 100 gsm, 100 gsm to 150 gsm, or 150 gsm to 200 gsm). A person of ordinary skill in the art would recognize that the weight of the airlaid mat layer or other layer can each independently be expanded above or below the ranges (above in this paragraph) as needed for various other applications and uses.

In some embodiments, the layer(s) of airlaid mat and/or other layer(s) can undergo at least one heat treatment, e.g., heat treatment 125, 135, 230, 240, 250, 450. In some embodiments, the heat treatment is used to consolidate the one or more layers of airlaid mat and/or other layers into a consolidated mat. In embodiments comprising layer(s) of airlaid mat and other layer(s), the layers can be combined before, during, and/or after heat treatment. In some embodiments, the layer(s) of airlaid mat and/or other layer(s) can undergo heat treatment to a certain temperature. In some embodiments, the conditions of the heat treatment (e.g., temperature and time) can be selected and optimized based on the bonding material, e.g., a bicomponent fiber and/or a liquid binder. In some embodiments, the conditions of the heat treatment (e.g., temperature and time) can be selected an optimized based on the amount of water or other liquid to be evaporated prior to proceeding with processing. In some embodiments, the heating can be performed in a hot press, an infrared system, or an oven (e.g., a pass-through oven). The conditions of the heat treatment can further depend on the source of the heat. For example, if a through air oven is used, one of ordinary skill in the art will understand how to select the temperature, air velocity, time, and speed of the pass-through oven in order to achieve the desired results. In some embodiments, the temperature chosen can be based on the melting temperature of the bonding materials. In some embodiments, the temperature chosen is at or above the melting temperature of the bonding material (e.g., bonding fibers). In embodiments where the bonding materials are bicomponent fibers, the temperature can be chosen to be at or above the melting temperature of the sheath of the bicomponent fiber, for instance, as discussed above. In some embodiments, the temperature is chosen such that the sheath polymer of the bicomponent fiber is partially melted or fully melted. In some embodiments, the temperature can be from 40° C. to 200° C. (e.g., 40° C. to 50° C., 50° C. to 100° C., 100° C. to 140° C., 140° C. to 200° C., 150° C. to 175° C.). In some embodiments, the temperature is 40° C. or greater (e.g., 50° C. or greater, 60° C. or greater, 70° C. or greater, 80° C. or greater, 90° C. or greater, 100° C. or greater, 110° C. or greater, 120° C. or greater, 130° C. or greater, 140° C. or greater, 150° C. or greater, 160° C. or greater, 170° C. or greater, 180° C. or greater, 190° C. or greater). In some embodiments, the temperature is 200° C. or less (e.g., 50° C. or less, 60° C. or less, 70° C. or less, 80° C. or less, 90° C. or less, 100° C. or less, 110° C. or less, 120° C. or less, 130° C. or less, 140° C. or less, 150° C. or less, 160° C. or less, 170° C. or less, 180° C. or less, 190° C. or less). In some embodiments, the temperature is chosen based on at least the bonding material and/or heat source. In some embodiments, the temperature is chosen based on at least the amount of water or other liquid to be evaporated from the airlaid mat.

In some embodiments, the layer(s) of airlaid mat and/or other layer(s) are heated for a period of time. In some embodiments, the period of time is an amount of time sufficient to fully melt (e.g., liquefy) or partially melt (e.g., soften, render tacky) the bonding fiber. In some embodiments, the layer(s) of airlaid mat and/or other layers are heated for a period of time to consolidate the layer(s) of airlaid mat and/or other layers to form a consolidated mat. In some embodiments, the period of time is 1 second to 10 minutes (e.g., 5 seconds to 10 seconds, 10 seconds to 20 seconds, 20 seconds to 30 seconds, 30 seconds to 45 seconds, 45 seconds to 60 seconds, 60 seconds to 90 seconds, 90 seconds to 120 seconds, 30 seconds to 120 seconds, 1 minute to 2 minutes, 1 minute to 5 minutes, 5 minutes to 10 minutes). In some embodiments, the period of time is 1 second or greater (e.g., 10 seconds or greater, 20 seconds or greater, 30 seconds or greater, 40 seconds or greater, 50 seconds or greater, 1 minute or greater, 2 minutes or greater, 4 minutes or greater, 6 minutes or greater, 8 minutes or greater). In some embodiments, the period of time is 10 minutes or less (e.g., 1 minute or less, 2 minutes or less, 4 minutes or less, 6 minutes or less, 8 minutes or less). In some embodiments, the heating time is chosen based on at least the bonding material and/or heat source. In some embodiments, the heating time is chosen based on at least the amount of water or other liquid to be evaporated from the airlaid mat.

In some embodiments, the layer(s) of airlaid mat and/or other layer(s) can undergo spray treatment 130, 225, 225a, 225b, 245, and/or 440. In some embodiments, spray treatment can include an aforementioned coating process, such as spraying.

In some embodiments, the filter media can be manufactured from a fibrous material and a bonding material comprising a liquid binder. In some embodiments, the fibrous material can be formed into a layer using an aforementioned nonwoven process, such as airlaying. In some embodiments, the liquid binder can be applied to the layer using an aforementioned coating or liquid impregnation process. In some embodiments, a flame-resistant treatment composition can be applied to the layer. In some embodiments, the liquid binder and the flame-resistant treatment composition can be applied to the layer simultaneously, as shown in FIG. 2a at 225.

In some embodiments, the filter media can be manufactured from a combination of a fibrous material with a bonding material comprising both bonding fibers and a liquid binder. In some embodiments, the bonding fibers comprise monocomponent fibers, bicomponent fibers, tricomponent fibers, and combinations thereof. In some embodiments, the fibrous material can be formed into a layer using an aforementioned nonwoven process, such as airlaying. In some embodiments, the liquid binder can be applied to the layer using an aforementioned coating or liquid impregnation process. In some embodiments, a flame-resistant treatment composition can be applied to the layer. In some embodiments, the liquid binder and the flame-resistant treatment composition can be applied to the layer simultaneously, as shown in FIG. 2a or 2b at 206.

In some embodiments, the bonding material is combined with the fibrous material in the layer through a combining process. Nonlimiting examples of a combining process to combine the bonding fiber and the fibrous material include needling, hydroentangling, adhesive bonding, spray bonding, thermal bonding, calendar bonding, through-air bonding, infrared bonding, ultrasonic bonding, welding, chemical bonding, felting, carding, airlaid, wetlaid, impaction, latex-bonding (e.g., by spraying web on top and bottom with a latex like styrene butadiene or acrylic, for instance), or any combination thereof.

The filter media can also include additives. In some embodiments, the additives can be introduced with the fibrous material and/or the bonding material. In some embodiments, the additives can be introduced during the filter media and/or layer-making processes. In some embodiments, the additives can be applied to the filter media after its formation. In some embodiments, the additives include fillers (e.g., clay, carbonates), pigments, dyes, colorants, water repellants, grease repellants, antifungal agents, antibacterial agents, bioactive materials for sizing, biomaterials (e.g., lignin or other biopolymers) for bonding material as matrix, anticorrosion agents, or a combination thereof. In addition, in some embodiments, the filter media is surface treated for functionality (e.g., water repellant) or decorative finish (e.g., bleaching, embossing, printing, etc.) as shown in FIG. 1 at 106 and FIG. 2a-2b at 206. In some embodiments, the additives include kaolin clay, china clay, calcium carbonate, titanium dioxide, and/or talc.

Figure 5:
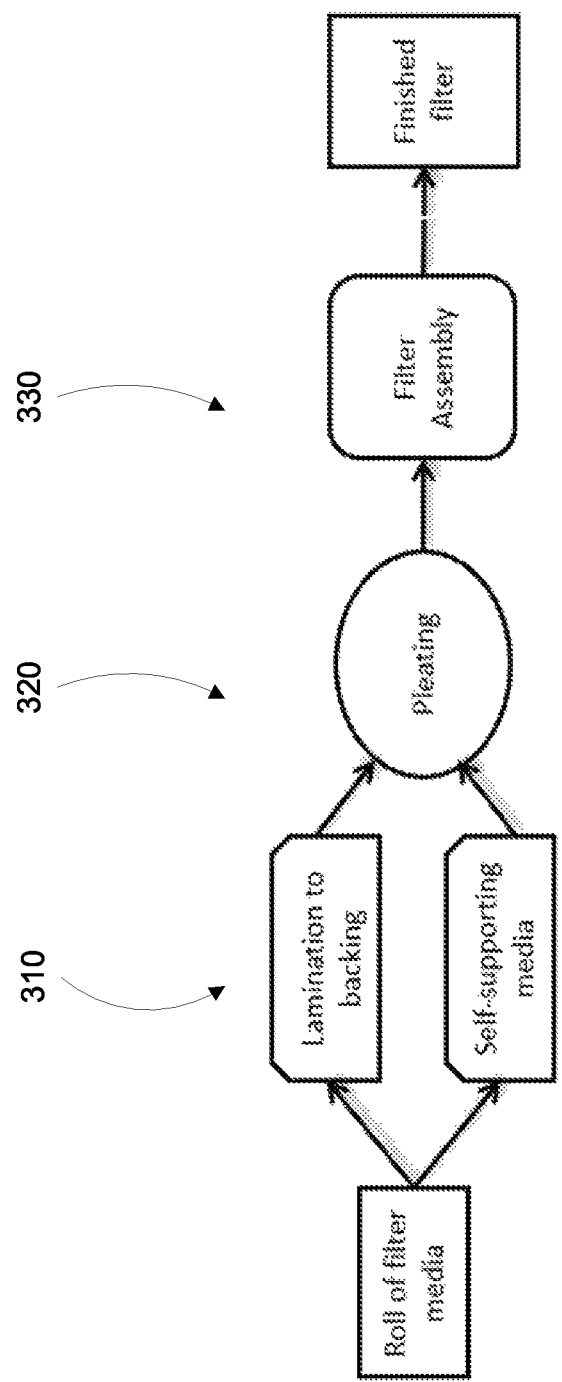
FIG. 5 shows a method for manufacturing a filter according to an embodiment of the present disclosure.

FIG. 5 illustrates a flow chart of a manufacturing process for some embodiments of a filter produced from a filter media. For example, a roll of filter media can be laminated to backing at 310, pleated at 320, assembled into a filter at 330, or a combination thereof to produce a finished filter.

In some embodiments, the filter media can be laminated, e.g., before or during forming a filter at 310. The lamination process 310 can be used to apply at least one layer to the filter media. The at least one layer can comprise a wire backing, a copper wire backing, an aluminum wire backing, a metal backing, a cardboard backing, a bio-based or synthetic polymer backing, a biodegradable backing, or a combination thereof. In some embodiments, the at least one layer can comprise an electric charge, a dielectric charge, electricized fibers, electrically conductive particles, a static charge, or a combination thereof. Suitable examples of a lamination process 310 can include, but are not limited to, pressing, rolling, spun bonding, melt blown, welding, adhesion, a combination thereof, or any other lamination process known to one of ordinary skill in the art. In some embodiments, the backing at 310 comprises wire. In some embodiments, the backing at 310 does not comprise wire. In some embodiments, the filter is self-supporting and does not use any backing at 310. In some embodiments, the filter is self-supporting and may involve applying heat in some sections the filter media. Other lamination processes or details can be found in the examples below.

In some embodiments, the filter media can be pleated at 320. The number of pleats can be selected, for instance, to optimize filter performance attributes such as pressure drop and dust holding capacity. The pleating can be done by any method known to a person of ordinary skill in the art. For example, the filter media can be fed into a pleating process 320 through at least one cylinder comprising folding members disposed on the external surface and recesses contained between the folding members. The rotation of the cylinders can be controlled such that the folding member of a first cylinder is in contact with the recess of a second cylinder to create a single pleat. In other embodiments, a comb can be used to laterally induce pleating on the filter media. Suitable examples of a pleating process 320 can include, but are not limited to, rolling, folding, combing, scoring, perforating, corrugating, or a combination thereof. It is understood that the aforementioned embodiment is provided by way of example and not limitation, and that many suitable pleating processes exist well-known to one of ordinary skill in the art. Other pleating processes or details can be found in the examples below.

In some embodiments, the pleating process 320 can be used to confer any desirable property to the filter and/or filter media. In some embodiments, the filter and/or filter media can present a pleat density of 5 PPF (pleats per linear foot) or more (e.g., 5.5 PPF or more, 6 PPF or more, 6.5 PPF or more, 7 PPF or more, 7.5 PPF or more, 8 PPF or more, 8.5 PPF or more, 9 PPF or more, 9.5 PPF or more, 10 PPF or more, 11 PPF or more, 12 PPF or more, 13 PPF or more, 14 PPF or more, 15 PPF or more, 16 PPF or more, 17 PPF or more, 18 PPF or more, 19 PPF or more). In some embodiments, the filter and/or filter media can present a pleat density of 20 PPF (pleats per inch) or less (e.g., 5.5 PPF or less, 6 PPF or less, 6.5 PPF or less, 7 PPF or less, 7.5 PPF or less, 8 PPF or less, 8.5 PPF or less, 9 PPF or less, 9.5 PPF or less, 10 PPF or less, 11 PPF or less, 12 PPF or less, 13 PPF or less, 14 PPF or less, 15 PPF or less, 16 PPF or less, 17 PPF or less, 18 PPF or less, 19 PPF or less). In some embodiments, the filter and/or filter media can present a pleat density of from 5 PPF to 20 PPF (e.g., 5 PPF to 6 PPF, from 6 PPF to 7 PPF, from 7 PPF to 8 PPF, from 8 PPF to 9 PPF, or from 9 PPF to 10 PPF, from 10 PPF to 11 PPF, from 11 PPF to 12 PPF, from 12 PPF to 13 PPF, from 13 PPF to 14 PPF, from 14 PPF to 15 PPF, from 15 PPF to 16 PPF, from 16 PPF to 17 PPF, from 17 PPF to 18 PPF, from 18 PPF to 19 PPF, from 19 PPF to 20 PPF, from 5 PPF to 10 PPF, from 10 PPF to 15 PPF, from 15 PPF to 20 PPF, from 8 PPF to 12 PPF, or 10 PPF to 20 PPF). In some embodiments, the filter and/or filter media is not pleated.

Additionally, the pleat density can be used to confer any desirable property to the filter. Suitable examples of such properties can include, but are not limited to, effective area, surface area, hydraulic diameter, turbulent flow intensity, outlet velocity, Reynolds number, or any other property known to be desirably controlled to one of ordinary skill in the art.

The pleat height and other filter dimensions (e.g., length, width, height) can also confer desirable properties on the filter. Suitable examples of such properties can include, but are not limited to, effective area, surface area, hydraulic diameter, turbulent flow intensity, outlet velocity, Reynolds number, or any other property known to be desirably controlled to one of ordinary skill in the art. The pleat height can be from 1 inch to 4 inches, depending on the end use of the filter (e.g., residential or commercial). Other filter dimensions can be optimized depending on the end use of the filter (e.g., residential or commercial, size requirements of the specific air conditioning system, etc.).

Some embodiments of this disclosure include filter media that are recyclable and/or biodegradable, surpass the expected life spans of current commercial filters, meet the safety requirements for contaminant elimination and fire prevention, or a combination thereof. The treated filter media can then be pleated, structurally reinforced, and formed into filters for HVAC applications. The cellulosic starting material and the various bonding and flame-resistant chemical treatments can be selected such that the resulting filter can be biodegradable. Numerous tests can be performed to evaluate the performance of and ensure consumer safety with the presently disclosed filter, and the passing of these tests indicates that the filter media is satisfactory for consumer use. In some embodiments, the filter media can satisfy the criteria for industry standards including, but not limited to, PAPTAC Standard D.3 (2011), PAPTAC Standard G.3 (2005), PAPTAC Standard D.4 (2013), PAPTAC Standard D.34 (2011), EDANA 20.2-89 (1999), ASHRAE 52.2 (2017), ASTM 737 (2004), and/or any other industry standards known to one of ordinary skill in the art. In some embodiments, it is understood that the filter media can satisfy the criteria for other industry standards for biodegradability, compostability, disintegration, degradation and plant growth including, but not limited to, Standard CAN/BNQ 0017-088 (2010), ISO 17088 (2012), ASTM 6400 (2012), ISO-20200 (2015), ASTM 5338 (2015), ASTM 6868, OECD 208 (2006), ASHRAE 52.2 (2017), UL 900 (2015), and/or any other industry standards known to one of ordinary skill in the art.

In some embodiments, it is understood that the filter can satisfy the criteria for other industry performance standard for general air filter and energy testing including, but not limited to, ASHRAE 52.2 (2017), EN 779 (2012), EN ISO 16890 (2016), DIN EN ISO 16890-1 (2016), DIN EN ISO 16890-2 (2016), DIN EN ISO 16890-3 (2016), DIN EN ISO 16890-4 (2016), BS EN ISO 16890-1 (2016), BS EN ISO 16890-2 (2017), BS EN ISO 16890-3 (2018), BS EN ISO 16890-4 (2019), AHRI Standard 680 (I-P) (2015), ANSI/AHAM AC-1 (2015), and/or any other industry standards known to one of ordinary skill in the art. In some embodiments, it is understood that the filter can satisfy the criteria for other industry standards for smoke and flammability rating including, but not limited to, UL 900 (2015), DIN53438 (1984), DIN4102 (1981), EN13501 (2007), NF P92-507 (2004), and/or any other industry standards known to one of ordinary skill in the art. In some embodiments, it is understood that the filter can satisfy the criteria for other industry standards for testing air filters used in potentially explosive environments including, but not limited to, ATEX 1999/92/EC (1999), ATEX 2014/24/EU (2014) and/or any other industry standards known to one of ordinary skill in the art.

In some embodiments, the filter media can have a permeability of 100 cubic ft/min (CFM) to 1000 CFM. In some embodiments, the filter media can have a permeability of 300 CFM to 700 CFM, including about 500 CFM and about 600 CFM.

The filter media and/or filter can be tested for its dust-holding capacity. In some embodiments, the disclosed filter media can have a similar or improved dust-holding capacity to conventional filter media, as measured by ASHRAE 52.2 (2017), using ISO 12103-1, A2 fine dust as contaminant. The filter media can have a dust holding capacity of 30 g/sq. ft. to 50 g/sq.ft. at a flow rate of 110 ft/min and a pressure drop (also known as resistance) of 1.0 inH$_2$O. The filter media can have a dust holding capacity of 30 g or greater (e.g., 32 g or greater, 34 g or greater, 36 g or greater, 38 g or greater, 40 g or greater, 42 g or greater, 44 g or greater, 46 g or greater, 48 g or greater) per square foot at an air flow rate of 110 ft/min and a pressure drop of 1.0 inH$_2$O. In some embodiments, the filter media can have a dust holding capacity of 50 g or less (e.g., 49 g or less, 47 g or less, 45 g or less, 44 g or less, 42 g or less, 40 g or less, 38 g or less, 36 g or less, 34 g or less, 32 g or less) per square foot at an air flow rate of 110 ft/min and a pressure drop of 1.0 inH$_2$O. In some embodiments, the filter media can have a dust holding capacity from 30 g to 50 g (e.g., 30 g to 40 g, 40 g to 50 g, 35 g, to 45 g, 30 g to 35 g, 35 g, to 40 g, 40 g to 45 g, 45 g to 50 g) per square foot at an air flow rate of 100 ft/min and pressure drop of 1.0 inH$_2$O.

In some embodiments, the disclosed filter can have a similar or improved dust-holding capacity to conventional filters, as measured by ASHRAE 52.2 (2017), using ASHRAE test dust (73% ISO 12103-1, A2 fine dust, 23% carbon black powder, 5% milled cotton linters) as contaminant. The filter can have a dust holding capacity of 40 g or greater (e.g., 42 g or greater, 44 g or greater, 46 g or greater, 47 g or greater, 48 g or greater, 49 g or greater, 50 g or greater, 51 g or greater, 52 g or greater, 53 g or greater, 54 g or greater, 55 g or greater, 56 g or greater, 57 g or greater, 58 g or greater, 59 g or greater, 60 g or greater, 61 g or greater, 62 g or greater, 63 g or greater, 64 g or greater, 65 g or greater, 66 g or greater, 67 g or greater, 68 g or greater, 69 g or greater, 70 g or greater, 71 g or greater, 72 g or greater, 73 g or greater, 74 g or greater, 75 g or greater, 76 g or greater, 77 g or greater, 78 g or greater, 79 g or greater, or 80 g or greater) for a 20 inch by 20 inch by 2 inch area filter at an air flow rate of 492 ft/min at a pressure drop of 1.5 inH$_2$O. In some embodiments, the filter can have a dust holding capacity of 80 g or less (e.g., 79 g or less, 78 g or less, 77 g or less, 76 g or less, 75 g or less, 74 g or less, 73 g or less, 72 g or less, 71 g or less, 70 g or less, 69 g or less, 68 g or less, 67 g or less, 66 g or less, 65 g or less, 64 g or less, 63 g or less, 62 g or less, 61 g or less, 60 g or less, 59 g or less, 58 g or less, 57 g or less, 56 g or less, 55 g or less, 54 g or less, 53 g or less, 52 g or less, 51 g or less, 50 g or less, 49 g or less, 48 g or less, 47 g or less, or 46 g or less) for a 20 inch by 20 inch by 2 inch area filter at an air flow rate of 492 ft/min and a pressure drop of 1.5 inH$_2$O. In some embodiments, the filter can have a dust holding capacity from 40 g to 80 g (e.g., 40 g to 45 g, 45 g to 50 g, 50 g to 55 g, 55 g to 60 g, 60 g to 65 g, 65 g to 70 g, 70 g to 75 g, 75 g to 80 g, 45 g to 65 g, 65 g to 80 g, 40 g to 60 g, 60 g to 80 g, or 55 g to 75 g) for a 20 inch by 20 inch by 2 inch area filter at an air flow rate of 492 ft/min at a pressure drop of 1.5 inH$_2$O. In some embodiments, the filter can have a dust holding capacity from 40 g to 160 g for a 24 inch by 24 inch by 2 inch area filter at an air flow rate of 492 ft/min at a pressure drop of 0.02 inH$_2$O to 1.5 inH$_2$O.

The filter media and/or filter can be tested for its pressure drop (also known as resistance). In some embodiments, the disclosed filter media can have a similar or improved pressure drop to conventional filter media, as measured by a Frazier permeability tester. The filter media can have a pressure drop of 0.06 inH$_2$O or greater (e.g., 0.07 inH$_2$O or greater, 0.08 inH$_2$O or greater, 0.09 inH$_2$O or greater, 0.10 inH$_2$O or greater, 0.11 inH$_2$O or greater, 0.12 inH$_2$O or greater, 0.13 inH$_2$O or greater, 0.14 inH$_2$O or greater, or 0.15 inH$_2$O or greater) at an air flow rate of 110 ft/min. In some embodiments, the filter media can have a pressure drop of 0.45 inH$_2$O or less (e.g., 0.15 inH$_2$O or less, 0.14 inH$_2$O or less, 0.13 inH$_2$O or less, 0.12 inH$_2$O or less, 0.11 inH$_2$O or less, 0.10 inH$_2$O or less, 0.09 inH$_2$O or less, 0.08 inH$_2$O or less, or 0.07 inH$_2$O or less) at an air flow rate of 110 ft/min. In some embodiments, the filter media can have a pressure drop from 0.06 inH$_2$O to 0.16 inH$_2$O (e.g., 0.06-0.08 inH$_2$O, 0.08-0.10 inH$_2$O, 0.10-0.12 inH$_2$O, 0.12-0.14 inH$_2$O, 0.14-0.16 inH$_2$O, 0.06-0.12 inH$_2$O, 0.12-0.16 inH$_2$O, 0.08-0.12 inH$_2$O) at an air flow rate of 110 ft/min. In some embodiments, the filter media has an initial pressure drop from 0.02 inH$_2$O to 0.45 inH$_2$O. In some embodiments, the filter media has an initial pressure drop from 0.02 inH$_2$O to 0.25 inH$_2$O. In some embodiments, the filter media has an initial pressure drop from 0.25 inH$_2$O to 0.37 inH$_2$O. In some embodiments, the filter media has an initial pressure drop from 0.13 inH$_2$O to 0.25 inH$_2$O. In some embodiments, the filter media has an initial pressure drop from 0.08 inH$_2$O to 0.17 inH$_2$O.

In some embodiments, the disclosed filter can have a similar or improved pressure drop to conventional filters, as measured by ASHRAE 52.2 (2017). The filter can have a pressure drop of 0.1 inH$_2$O or greater (e.g., 0.15 inH$_2$O or greater, 0.2 inH$_2$O or greater, 0.25 inH$_2$O or greater, 0.3 inH$_2$O or greater, 0.35 inH$_2$O or greater, 0.4 inH$_2$O or greater, 0.45 inH$_2$O or greater, 0.5 inH$_2$O or greater, 0.55 inH$_2$O or greater, 0.6 inH$_2$O or greater) at an air flow rate of 492 ft/min. In some embodiments, the filter can have a pressure drop of 0.65 inH$_2$O or less (e.g., 0.6 inH$_2$O or less, 0.55 inH$_2$O or less, 0.5 inH$_2$O or less, 0.45 inH$_2$O or less, 0.4 inH$_2$O or less, 0.35 inH$_2$O or less, 0.3 inH$_2$O or less, 0.25 inH$_2$O or less, 0.2 inH$_2$O or less, 0.15 inH$_2$O or less) at an air flow rate of 492 ft/min. In some embodiments, the filter can have a pressure drop from 0.1 inH$_2$O to 0.65 inH$_2$O (e.g., 0.1-0.36 inH$_2$O, 0.36-0.65 inH$_2$O, 0.3-0.45 inH$_2$O, 0.4-0.65 inH$_2$O, 0.2-0.3 inH$_2$O) at an air flow rate of 492 ft/min. In some embodiments, the filter can have a pressure drop of less than 0.51 inH$_2$O. In some embodiments, the filter can have a pressure drop of 0.37 inH$_2$O to 0.51 inH$_2$O. In some embodiments, the filter can have a pressure drop of 0.35 inH$_2$O to 0.49 inH$_2$O. In some embodiments, the filter can have a pressure drop of 0.30 inH$_2$O to 0.37 inH$_2$O. In some embodiments, the filter can have a pressure drop of 0.39 inH$_2$O to 0.26 inH$_2$O. In some embodiments, the filter can have a pressure drop of 0.5 inH$_2$O or less, including 0.05 inH$_2$O to 0.4 inH$_2$O.

The filter media and/or filter can be tested for filtration efficiency. In some embodiments, the filter media can have a similar or improved filtration efficiency compared to conventional filter media, as measured by the Minimum Efficiency Reporting Value (MERV) defined in ASHRAE Standard 52.2 (2017) as reflected in Table 1 below.

TABLE 1

Minimum Efficiency Reporting Value (MERV) Parameters

| Standard 52.2 Minimum Efficiency Reporting Values (MERV) | Composite Average Particle Size Efficiency % in Size Range µm | | | Average Arrestance (%) |
|---|---|---|---|---|
| | Range 1 0.30-1.0 | Range 2 1.0-3.0 | Range 3 3.0-10.0 | |
| 1 | n/a | n/a | $E_3 < 20$ | $A_{avg} < 65$ |
| 1 | n/a | n/a | $E_3 < 20$ | $65 \leq A_{avg}$ |
| 1 | n/a | n/a | $E_3 < 20$ | $70 \leq A_{avg}$ |
| 4 | n/a | n/a | $E_3 < 20$ | $75 \leq A_{avg}$ |
| 5 | n/a | n/a | $20 \leq E_3$ | n/a |
| 6 | n/a | n/a | $35 \leq E_3$ | n/a |
| 7 | n/a | n/a | $50 \leq E_3$ | n/a |
| 8 | n/a | $20 \leq E_2$ | $70 \leq E_3$ | n/a |
| 9 | n/a | $35 \leq E_2$ | $75 \leq E_3$ | n/a |
| 10 | n/a | $50 \leq E_2$ | $80 \leq E_3$ | n/a |
| 11 | $20 \leq E_1$ | $65 \leq E_2$ | $85 \leq E_3$ | n/a |
| 12 | $35 \leq E_1$ | $80 \leq E_2$ | $90 \leq E_3$ | n/a |
| 13 | $50 \leq E_1$ | $85 \leq E_2$ | $90 \leq E_3$ | n/a |
| 14 | $75 \leq E_1$ | $90 \leq E_2$ | $95 \leq E_3$ | n/a |
| 15 | $85 \leq E_1$ | $90 \leq E_2$ | $95 \leq E_3$ | n/a |
| 16 | $95 \leq E_1$ | $95 \leq E_2$ | $95 \leq E_3$ | n/a |

The filter media can have a MERV rating of 6 or higher (e.g., 7 or higher, 8 or higher, 9 or higher, 10 or higher, 11 or higher, 12 or higher, 13 or higher, 14 or higher, or 15 or higher) at an air flow rate of 110 ft/min. In some embodiments, the filter media can have a MERV rating of 16 or less (e.g., 15 or less, 14 or less, 13 or less, 12 or less, 11 or less, 10 or less, 9 or less, or 8 or less) at an air flow rate of 110 ft/min. In some embodiments, the filter media can have a MERV rating from 7 to 16 (e.g., from 8 to 16, from 9 to 16, from 10 to 16, from 10 to 12, from 9 to 12, from 8 to 12, from 7 to 12, from 7 to 10, from 8 to 10, or from 9 to 10) at an air flow rate of 110 ft/min. The filter can have a MERV rating of 6 or higher (e.g., 7 or higher, 8 or higher, 9 or higher, 10 or higher, 11 or higher, 12 or higher, 13 or higher, 14 or higher, or 15 or higher) at an air flow rate of 492 ft/min. In some embodiments, the filter can have a MERV rating of 16 or less (e.g., 15 or less, 14 or less, 13 or less, 12 or less, 11 or less, 10 or less, 9 or less, or 8 or less) at an air flow rate of 492 ft/min. In some embodiments, the filter can have a MERV rating from 7 to 16 (e.g., from 8 to 16, from 9 to 16, from 10 to 16, from 10 to 12, from 9 to 12, from 8 to 12, from 7 to 12, from 7 to 10, from 8 to 10, or from 9 to 10) at an air flow rate of 492 ft/min. In some embodiments, the filter can have a MERV rating of 8 at an air flow rate of 492 ft/min. In some embodiments, the filter can have a MERV rating of 9 at an air flow rate of 492 ft/min. In some embodiments, the filter can have a MERV rating of 10 at an air flow rate of 492 ft/min.

In some embodiments, the filter satisfies the criteria for UL 900 (2015).

In some embodiments, the filter and/or filter media can comprise materials such that it is recyclable, compostable, or biodegradable. In some embodiments, for instance, a used filter and/or filter media can be recycled to provide a wood fiber source for another cellulose-based material.

Embodiments of the present disclosure can provide filters and/or filter media for use in residential, commercial, and/or industrial HVAC applications. Embodiments of the present disclosure can provide filters and/or filter media that can be useful in a variety of fields including, but not limited to, transportation, manufacturing, health care, petroleum processing, high technology, and food processing.

The following examples are provided by way of illustration but not by way of limitation.

EXAMPLES

The present invention is also described and demonstrated by way of the following examples. However, the use of these and other examples anywhere in the specification is illustrative only and in no way limits the scope and meaning of the invention or of any exemplified term. Likewise, the invention is not limited to any particular preferred embodiments described here. Indeed, many modifications and variations of the invention may be apparent to those skilled in the art upon reading this specification, and such variations can be made without departing from the invention in spirit or in scope. The invention is therefore to be limited only by the terms of the appended claims along with the full scope of equivalents to which those claims are entitled.

Example 1: Filter Media

Four parts of Southern Bleached Softwood Kraft pulp roll underwent a defibering process in a Kamas hammermill before being combined with one part of TREVIRA 255 bicomponent fibers (core-sheath PET/PE, 1.3 dtex, 6 mm). The blended fibers then underwent forming of a mat at a rate of 3.5 meters per minute on a Spike forming line. The mat was finally consolidated in a through-air oven at 185° C. for 69 seconds to create a filter media with the properties in Table 2 below. The filter media was used to make the finished filters of Example 2.

TABLE 2

Filter media properties

| Grammage (g/m²) | Bulk (cm³/g) | Tensile Strength (kN/m) | | Filtration Performance Air flow velocity 110 ft/min | | | | | | Permeability (cfm at 0.5 inH₂O) |
|---|---|---|---|---|---|---|---|---|---|---|
| | | MD | CD | E1 | E2 | E3 | MERV | Pressure Drop (inH₂O) | (Pa) | |
| 80 | 22 | 0.357 | 0.224 | 7.3 | 36 | 83 | 9 | 0.13 | 33 | 396 |

Example 2: Finished Filter—Impact of Pleat Count

A roll of the filter media prepared in Example 1 was converted to finished filters with different pleat counts, each having dimensions (height by width by depth, in inches) of 20×20×2. The converting process consisted of three separate steps performed sequentially. In order to increase the strength of the filter media and give it good pleatability, the roll of media was first combined with a reinforcing wire mesh. This was performed using a hot-melt laminator in which an adhesive was applied to the mesh prior to its lamination to the filter media. The roll of laminated filter media was then pleated using a Star Gear pleater from GMD Machinery. The pleating process involved unwinding the roll of laminated filter media from an unwind station and passing the media through machined steel gears to create pleats in the media of nominal size 2 in. A pleat cutter located at the exit of the pleater was used to cut the pleated media into sections comprising either 20, 25 or 27 pleats. Finished filters were finally produced by inserting the different sections of pleated media into rigid cardboard frames that were then sealed with polyvinyl acetate glue. The entire roll of filter media was thus converted into finished filters without any issue, indicating that media prepared according to Example 1 had sufficient strength to withstand converting on commercial equipment. The filters having different pleat counts were tested and had the following properties as shown in Table 3 below and in FIG. 6, which shows a plot of filtration efficiency versus airborne particle size for filters with different pleat counts made according to Example 2.

Figure 6:
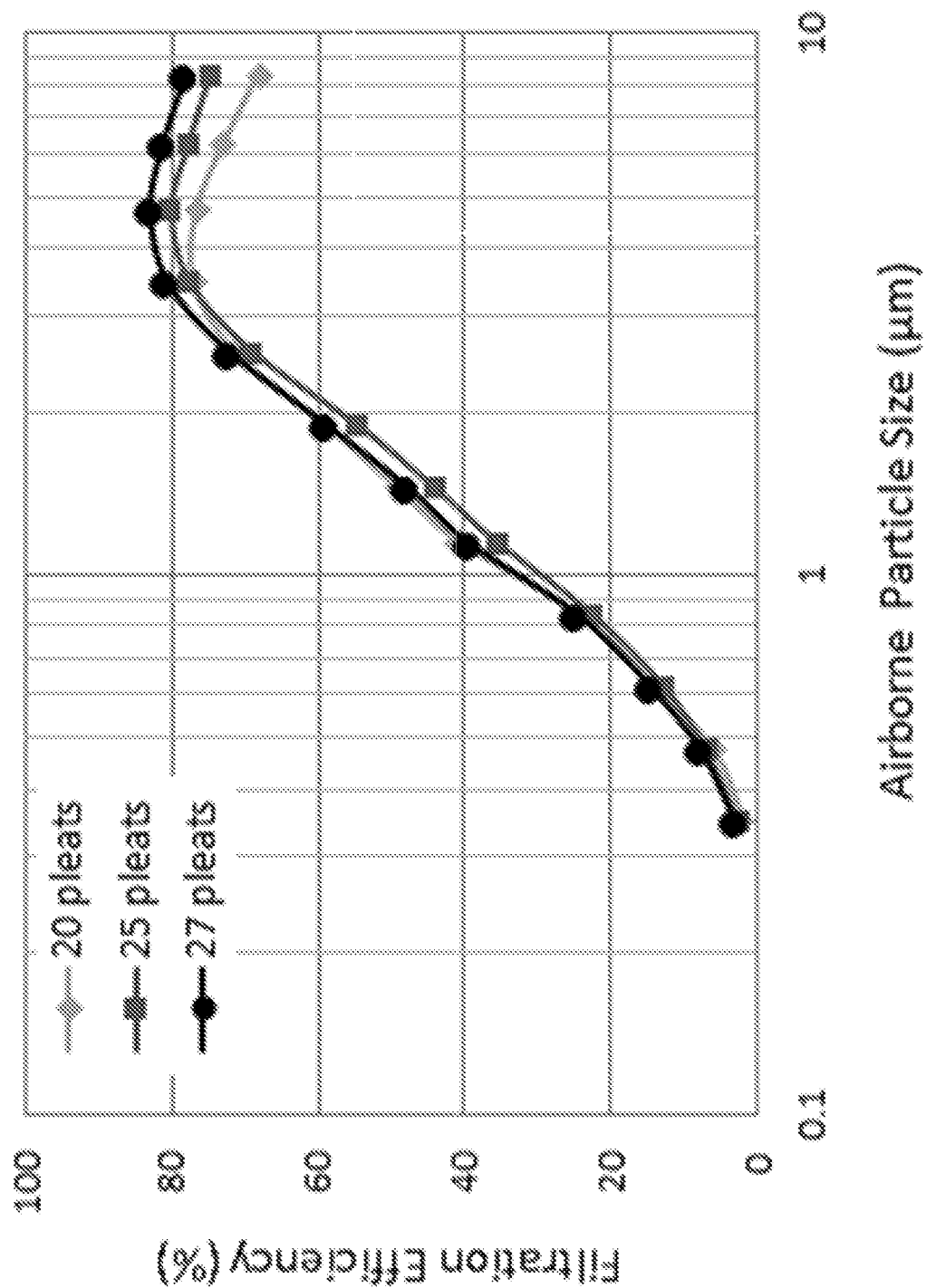
FIG. 6 shows a plot of filtration efficiency versus airborne particle size for a filter according to the present disclosure with a variety of numbers of pleats.

Results from Table 3 and FIG. 6 illustrate how changing the number of pleats can impact the filtration performance of the filter, in particular its pressure drop and dust holding capacity. All three filters made according to Example 2 had a MERV rating of at least 8, a common requirement for medium performance HVAC filtration applications. The filters also had good dust holding capacity and acceptable pressure drop measured at a flow velocity of 492 ft/min. In this particular embodiment of the disclosure however, the filters did not meet the flammability requirements defined by standard UL 900.

Example 3: Finished Filter—Self-Supporting Media

The filter media prepared in Example 1 was converted to a finished, self-supporting filter with no wire backing using the following procedure. A section of filter media having dimensions (length by width, in inches) of 92.7×19.5 (228× 49.5 cm) was pleated manually by repeatedly folding the media along lines oriented perpendicular to the length of the sample. The distance between successive fold lines was 1.8 po (4.6 cm) resulting in a section of media with 25 pleats. A clothes iron with its soleplate warmed to 180° C. was then pressed against the edge of each pleat in order to melt the sheath of bicomponent fibers present at those edges. Once the heat source was removed, the outer layer of the bicomponent fibers resolidified, setting the media in the new, pleated configuration. The section of self-supporting pleated media was then inserted into a rigid cardboard frame having dimensions (height by width by depth, in inches) of 20×20× 2. The cardboard frame was finally sealed with polyvinyl acetate glue. The finished filter was tested and had the properties in Table 4 below. The pleat structure imparted to the media remained in place during filtration efficiency testing of the finished filter, which was performed at a flow velocity of 492 ft/min. This shows that it is possible to produce a self-supporting filter with media prepared according to this disclosure. The converting procedure would need

TABLE 3

Filter properties

| Pleats # | | | | Filtration Performance Air flow velocity: 492 ft/min | | | Dust Holding Capacity (g) | Flame Extension (feet) | UL 900 | | |
|---|---|---|---|---|---|---|---|---|---|---|---|
| | E1 | E2 | E3 | MERV | Pressure Drop (inH₂O) | (Pa) | | | # Sparks | Smoke Density (in²) | Result |
| 20 | 12 | 55 | 74 | 8 | 0.42 | 105 | 57 | | | | |
| 25 | 11 | 51 | 78 | 9 | 0.35 | 87 | 69 | 6 | >100 | 0.03 | Fail |
| 27 | 12 | 55 | 81 | 10 | 0.40 | 100 | 64 | | | | | to be optimized in order to limit its impact on pressure drop and dust holding capacity which is significant, as can be seen by comparing the properties of the filter of Example 5 to those of the filter of Example 2 (also included in Table 4).

TABLE 4

Filter properties
Filtration Performance
Air flow velocity: 492 ft/min

| Sample | E1 | E2 | E3 | MERV | Pressure Drop (inH$_2$O) | (Pa) | Dust Holding Capacity (g) |
|---|---|---|---|---|---|---|---|
| Self-supporting | 16 | 62 | 75 | 9 | 0.63 | 157 | 11 |
| Wire-backed | 11 | 51 | 78 | 9 | 0.35 | 87 | 69 |

Example 4: Filter Media—Chemical Treatment

The filter media prepared in Example 1 was chemically treated with an aqueous solution containing 0.028 mol/L of citric acid and 0.015 mol/L of sodium hypophosphite monohydrate. The solution was applied to the filter media using a laboratory spraying system consisting of four flat spray nozzles with a spray angle of 40° and an approximate orifice diameter of 0.026 inch. The nozzles were fixed to a spray boom placed 25 cm above a conveyor belt carrying the filter media and moving at a speed of 4 m/min. Distance between neighboring nozzles on the boom was set to 16.5 cm. The solution was sprayed onto the media at a flow rate of 1.5 L/min. The treated media was allowed to dry at room temperature for 24 hours and then placed in a circulating air oven at 170° C. for 5 min. The amounts of citric acid and sodium hypophosphite monohydrate added to the filter media in this manner were 3.85 and 1.15%, respectively, based on dry media weight prior to treatment. The filter media after treatment had the properties shown in Table 5 below. The Dust Holding Capacity (DHC) is defined here as the amount of ISO 12103-1, A2 fine test dust held by the filter media when the pressure drop reaches 1.0 inH$_2$O. The treated media was used to make one of the finished filters of Example 5.

Example 5: Finished Filter—Impact of Chemical Treatment

The filter media of Example 4 was converted to a finished filter using the following procedure. A paint brush was used to apply polyvinyl acetate glue on a piece of reinforcing wire mesh having dimensions (length by width, in inches) of 94×19 (240×48.3 cm). The wire mesh was then pressed against a section of the filter media of Example 5 having dimensions (length by width, in inches) of 92.7×19.5 (228× 49.5 cm). The media thus laminated was then pleated manually by repeatedly folding the media along lines oriented perpendicular to the length of the sample. The distance between successive fold lines was 1.8 po (4.6 cm) resulting in a section of media with 25 pleats. That section of pleated media was then inserted into a rigid cardboard frame having dimensions (height by width by depth, in inches) of 20×20× 2. The cardboard frame was finally sealed with polyvinyl acetate glue. Three different finished filter specimens were prepared from the laminated filter media using the above procedure. The finished filters had the properties shown in Table 6 below. Properties measured on the finished filters from Example 2 are also included in the Table for comparison. Data in Table 6 illustrate the dramatic impact chemical treatment of the media has on the results from flammability testing performed according to standard UL 900. In that test, the filter is exposed to a burning flame inside a duct in which air is flowing at an average velocity of 199 ft/min. The UL 900 standard places limits on the amount of smoke and the number of sparks that can exit the duct during the three-minute test period. In addition, no flame can extend beyond the end of the duct, which is located 8 feet downstream from the filter. As seen in Table 6, over 100 sparks exited the test duct when the filter made from the untreated media of Example 1 was exposed to the burning flame. By contrast, only 5 sparks exited the duct when the filter made from the chemically treated media was tested under identical conditions. That number is well below the 25 sparks allowed by the standard. Both filters met the requirements related to smoke density and flame extension. Example 5 provides evidence that a chemical treatment with a solution of citric acid and sodium hypophosphite is an effective means to impart flame resistance to a filter media used for HVAC applications.

TABLE 5

Filter media properties

Filtration Performance
Air flow velocity: 110 ft/min

| Grammage after treatment (g/m$^2$) | Bulk (cm$^3$/g) | E1 | E2 | E3 | MERV | Pressure Drop (inH$_2$O) | (Pa) | Dust Holding Capacity (g/ft$^2$) | Permeability (cfm at 0.5 inH$_2$O) |
|---|---|---|---|---|---|---|---|---|---|
| 84 | 36 | 1.8 | 20 | 71 | 8 | 0.10 | 25 | 40.0 | 422 |

TABLE 6

Filter properties

| | | | | | | | Breach Test: | | Elevated Humidity Exposure Test: | | UL 900 | | | |
|---|---|---|---|---|---|---|---|---|---|---|---|---|---|---|
| | | | | | Pressure Drop | | Dust Holding Capacity | Final pressure drop | | Final pressure drop | | Flame Extension | # Sparks | Smoke Density |
| Sample | E1 | E2 | E3 | MERV | (inH$_2$O) | (Pa) | (g) | (inH$_2$O) | (Pa) | (inH$_2$O) | (Pa) | (feet) | | (in$^2$) | Result |
| Untreated | 11 | 51 | 78 | 9 | 0.35 | 87 | 69 | — | — | — | — | 6 | >100 | 0.03 | Fail |
| Treated | 13 | 49 | 77 | 9 | 0.47 | 117 | 81 | 4.22 | 1051 | 0.54 | 135 | 6.5 | 5 | 0.03 | Pass |

Filtration Performance — Air flow velocity: 492 ft/min

Figure 9:
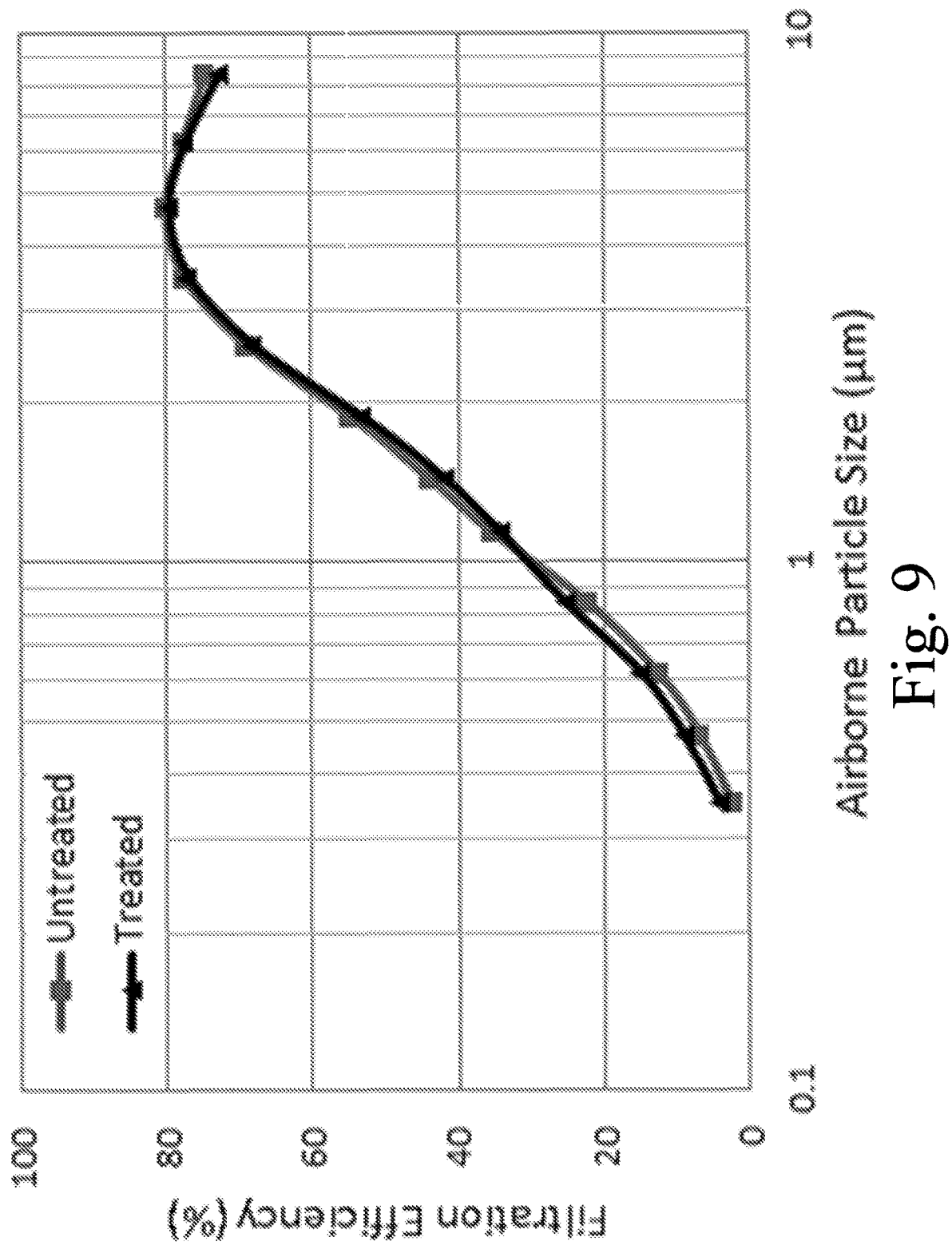
FIG. 9 shows a plot of filtration efficiency versus airborne particle size for filters according to the present disclosure.

FIG. 9 shows a plot of filtration efficiency versus airborne particle size for the two filters made either from the untreated or the treated media. As can be seen in FIG. 9, the two filters had very similar filtration efficiency curves, and both had a MERV rating of 9. Without wishing to be bound by theory, differences in the way the treated and untreated media were converted into finished filters could explain the significant differences in pressure drop and dust holding capacity observed in Table 6.

Finished filters made from the treated media were also subjected to two additional tests. The first test was the wet breach test which measures a filter's resistance to collapse under loading conditions. The test procedure, which was developed by an independent laboratory, involves loading the filter with a water mist spray for 30 min and then with a combination of ASHRAE test dust and water mist spray until the filter collapses. The pressure drop measured as the filter collapses is the test result. In the case of the finished filter made from the treated media of Example 5, that pressure drop was 4.22 inH$_2$O. By comparison, the same test was performed on a commercial filter and the result was 2.00 inH$_2$O. The finished filter prepared according to Example 5 therefore offers better resistance to collapse under wet conditions as compared to the commercial filter (Aerostar Series 400 Pleat Standard Capacity, with 17 pleats). The finished filter of Example 5 was also subjected to an elevated humidity exposure test, in which the filter was exposed to a high relative humidity environment (R.H. >95%) for a period of 8 hours, during which the change in pressure drop across the filter was monitored. As seen from Table 6, that increase in pressure drop was slightly less than 15% (pressure drop increasing from 0.47 inH$_2$O to 0.54 inH$_2$O). Results from the wet breach and elevated humidity exposure tests show that, while filter media of the present disclosure comprise a majority of hygroscopic, cellulosic fibers, the performance of filters made from such media is not overly affected by the presence of moisture or liquid water in the air.

Example 6: Filter Media—Chemical Treatment

Seven parts of Southern Bleached Softwood Kraft pulp roll underwent a defibering process in a Kamas hammermill before being combined with three parts of TREVIRA 255 bicomponent fibers (core-sheath PET/PE, 1.3 dtex, 6 mm). The blended fibers underwent forming of a mat of grammage 75 g/m$^2$ at a rate of 7.5 meters per minute on a Dan-Web forming line. The mat was then consolidated in a through-air oven at 165° C. for 69 seconds and wound into a roll. Chemical treatment of the filter media with an aqueous solution containing 0.053 mol/L of citric acid and 0.029 mol/L of sodium hypophosphite monohydrate was performed in a separate step. First, the roll of consolidated filter media was unwound onto the conveyor belt of the Dan-Web line now moving at a speed of 3 meters per minute. The solution was applied to the filter media using a spraying system installed on the Dan-Web line. That system consisted of four flat spray nozzles (UniJet, type TP, orifice number 730039) fixed to a spray boom such that the opening of the nozzles was located 20 cm above the conveyor belt. Nozzle pressure and flow rate were adjusted until the total amount of solution added to the filter media was about 425 g/m$^2$. The treated media then passed through a through-air oven at 190° C. for 80 seconds. The amounts of citric acid and sodium hypophosphite monohydrate added to the filter media in this manner were 5.77 and 1.73%, respectively, based on dry media weight prior to treatment. This represents a total of 7.5% addition of chemicals, based on dry media weight prior to treatment. The filter media after treatment had the properties shown in Table 7 below. Rolls of treated media were used to make the finished filters of Example 7.

TABLE 7

Filter media properties

| Grammage | Bulk | | | | | Filtration Performance Air flow velocity: 110 ft/min | | Permeability |
|---|---|---|---|---|---|---|---|---|
| | | | | | | Pressure Drop | | (cfm at 0.5 |
| (g/m$^2$) | (cm$^3$/g) | E1 | E2 | E3 | MERV | (inH$_2$O) | (Pa) | inH$_2$O) |
| 80 | 30 | 5 | 27 | 84 | 8 | 0.14 | 34 | 459 |

Example 7: Finished Filters and Field Trial

Rolls of filter media prepared in Example 6 were converted to finished filters each having dimensions (height by width by depth, in inches) of 24×24×2. Details of the converting process can be found in Example 2. In the case of Example 7, the filter media after lamination and pleating was cut into sections comprising either 16, 18, 20, 24 or 30 pleats. Finished filters with different numbers of pleats were tested and had the following properties as shown in Table 8 below. Results from Table 8 indicated that increasing the number of pleats tended to have a positive impact on both pressure drop and dust holding capacity.

TABLE 8

Filter properties
Filtration Performance
Air flow velocity: 492 ft/min

| # of pleats | E1 | E2 | E3 | MERV | Pressure Drop (inH₂O) | (Pa) | Dust Holding Capacity (g) |
|---|---|---|---|---|---|---|---|
| 16 | 11 | 61 | 70 | 8 | 0.38 | 95 | 61 |
| 18 | 13 | 52 | 61 | 7 | 0.32 | 80 | 78 |
| 20 | 10 | 49 | 67 | 7 | 0.32 | 80 | 87 |
| 24 | 11 | 45 | 67 | 7 | 0.28 | 70 | 113 |
| 30 | 11 | 43 | 70 | 8 | 0.30 | 75 | 147 |

Five filter prototypes with 20 pleats were also subjected to flammability testing performed according to standard UL 900. As seen in Table 9 below, all five filters met the requirements defined by the standard. Specifically, the number of sparks exiting the test duct was below 25, no flame extended beyond the end of the test duct (8 feet) and the smoke density was well below the allowed limit of 9 in².

TABLE 9

Results from UL 900 testing

UL 900

| Filter ID | Flame Extension (feet) | Number of Sparks | Smoke Density (in²) | Result |
|---|---|---|---|---|
| 1 | 3 | 9 | 0.05 | Pass |
| 2 | 3 | 9 | 0.16 | Pass |
| 3 | 3 | 10 | 0.08 | Pass |
| 4 | 3.5 | 14 | 0.08 | Pass |
| 5 | 5 | 8 | 0.14 | Pass |

Some of the finished filter prototypes with 30 pleats were also tested under operating conditions in a small critical care hospital located in a suburb of a large North American city. The system used for the test was a supply fan delivering outside air at a capacity of 36,000 cfm at 500 fpm. Nine filter prototypes were installed in the pre-filter section of the system together with an equal number of commercial filters having the same dimensions and pleat count. The resistance measured across the bank of pre-filters just after installation was 0.20 inH₂O. After 78 days of operation, that resistance had increased to 0.30 inH₂O. The filters were finally replaced after 165 days of operation at which point in time the resistance to flow had reached 0.35 inH₂O. The independent filter distributor who conducted the trial noted that the opacity of the filter was in line with expectations after 5+ months service. He noted that the prototype filters appeared darker/dirtier than the controls, leading one to conclude that these prototype filters may be more efficient. His overall impression was positive, with the understanding that the selected location was very sheltered and dry.

Example 8: Comparison Between Filters of the Present Invention and a Commercial Filter Properties of the filter of Example 2 having dimensions (height by width by depth, in inches) of 20×20×2 and a pleat count of 25 were compared to those of a commercial filter (Aerostar Series 400 Pleat Standard Capacity, manufactured by Dafco Filtration Group) having the same dimensions and a pleat count of 17. The filter of Example 2 and the commercial filter were tested and had the following properties as shown in Table 10 below.

TABLE 10

Filter properties

Filtration Performance
Air flow velocity: 492 ft/min

| Sample | Media Grammage (g/m²) | Filter size (in) | Pleat count | E1 | E2 | E3 | MERV | Pressure Drop (inH₂O) | (Pa) | Dust Holding Capacity (g) |
|---|---|---|---|---|---|---|---|---|---|---|
| Filter prototype | 80 | 20 × 20 × 2 | 25 | 11 | 51 | 78 | 9 | 0.35 | 87 | 69 |
| Commercial filter | 74 | 20 × 20 × 2 | 17 | 12 | 50 | 79 | 9 | 0.24 | 60 | 48 |

Figure 7:
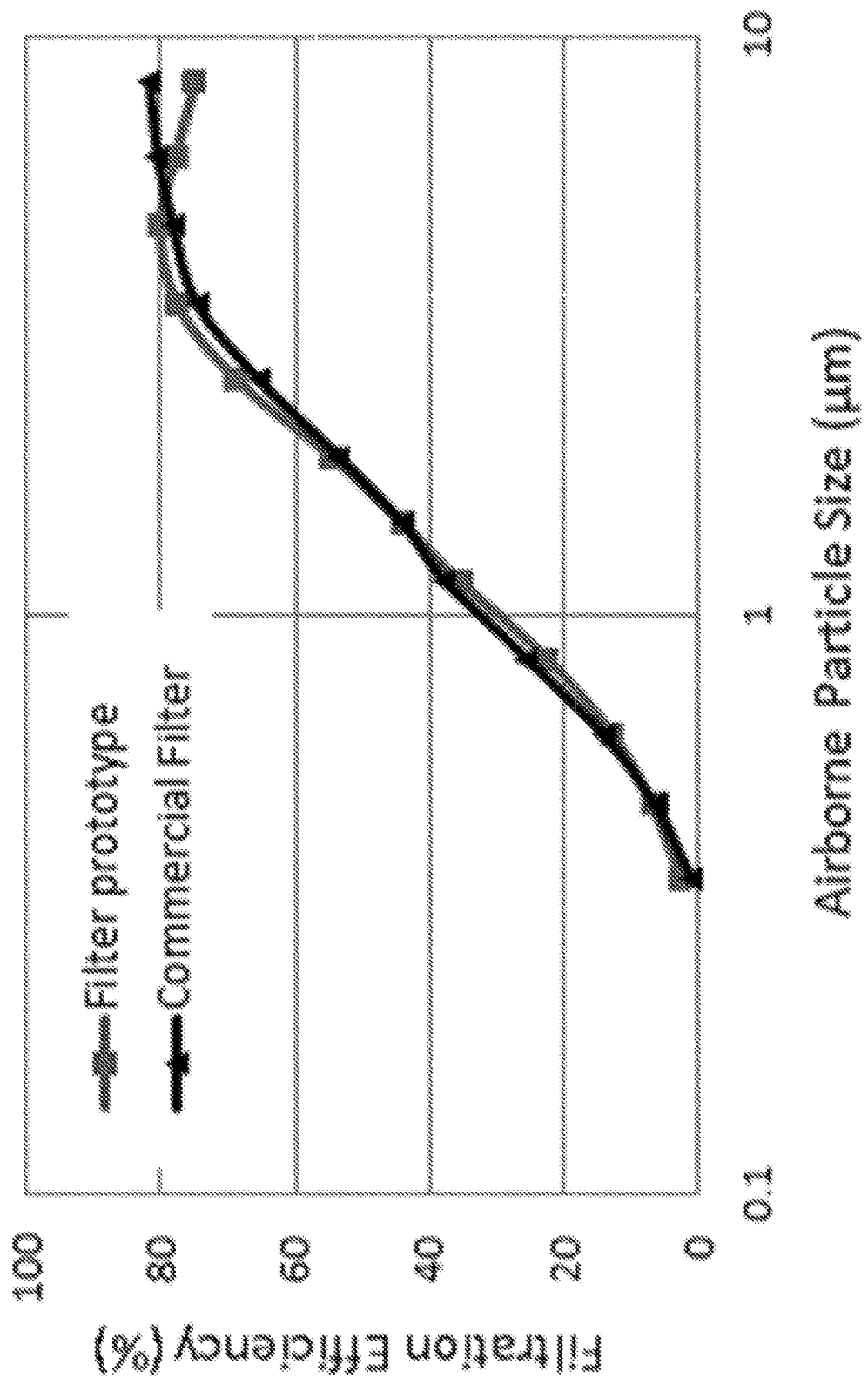
FIG. 7 shows a plot of filtration efficiency versus airborne particle size for a filter according to the present disclosure as compared to a commercial filter.
Figure 8:
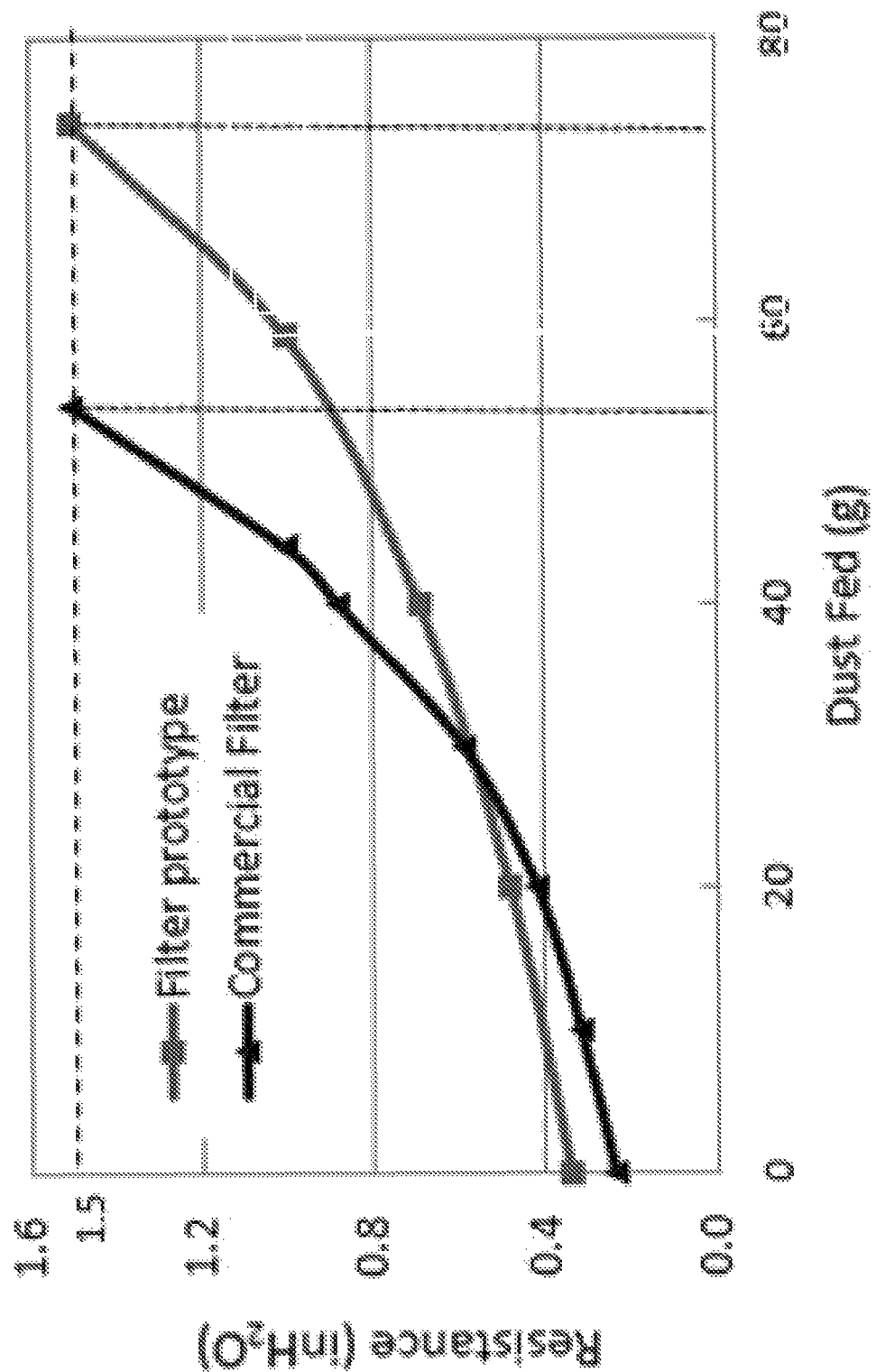
FIG. 8 shows the increase in pressure drop with the dust loading for a filter according to the present disclosure as compared to a commercial filter.

FIG. 7 further shows a plot of filtration efficiency versus airborne particle size for the filter of Example 2 as compared to the commercial filter. As can be seen in FIG. 7, the two filters had very similar filtration efficiency curves, and both had a MERV rating of 9. FIG. 7 shows the increase in pressure drop (or resistance) with dust loading for the filter of Example 2 as compared to the commercial filter. The Dust Holding Capacity (DHC) is defined as the amount of ASHRAE test dust held by the filter when the pressure drop reaches 1.5 inH₂O. It is an indirect measure of the expected service life of the filter. As can be seen in FIG. 8, while the pressure drop measured across the commercial sample was lower initially, it increased more rapidly as dust was fed to the filter and became higher than that measured on the prototype sample when the amount of dust fed reached 30 g. As a result, the prototype filter had a significantly higher DHC (69 g vs. 48 g as seen in Table 10) as compared to the commercial filter. The difference in DHC may be attributed at least in part to the higher pleat count in the prototype filter.

Properties of the filter of Example 7 having dimensions (height by width by depth, in inches) of 24×24×2 and a pleat count of 20 were also compared to those of two commercial filters having the same dimensions and pleat count. The filter of Example 7 and the commercial filters were tested and had the following properties as shown in Table 11 below.

TABLE 11

| | | | Filter properties | | | | | | |
|---|---|---|---|---|---|---|---|---|---|
| | | | | | | | Filtration Performance Air flow velocity: 492 ft/min | | Dust Holding Capacity |
| Sample | Filter size (in) | Pleat count | E1 | E2 | E3 | MERV | Pressure Drop (inH$_2$O) | (Pa) | (g) |
| Filter prototype | 24 × 24 × 2 | 20 | 11 | 50 | 68 | 7 | 0.33 | 82 | 85 |
| Commercial filter A | 24 × 24 × 2 | 20 | 8 | 41 | 63 | 7 | 0.20 | 50 | 51 |
| Commercial filter B | 24 × 24 × 2 | 20 | 8 | 42 | 67 | 7 | 0.19 | 47 | 56 |

As can be seen from Table 11, all three filters had a MERV rating of 7. While the prototype filter had higher initial pressure drop as compared to the commercial filters, it also had a significantly higher dust holding capacity. The difference in dust holding capacity is not likely to be due to pleat count as all three filters comprised 20 pleats.

Example 9: Filter Media—Impact of Bicomponent Fiber Diameter and Length

Two different filter media were prepared for Example 9. The first filter media was prepared as follows. Four parts of Southern Bleached Softwood Kraft pulp roll underwent a defibering process in a Kamas hammermill before being combined with one part of TREVIRA 255 bicomponent (bico) fibers (core-sheath PET/PE, 1.3 dtex, 6 mm). The blended fibers then underwent forming of a mat at a rate of 3.5 meters per minute on a Spike forming line. The mat was finally consolidated in a through-air oven at 175° C. for 69 seconds to create a filter media with the properties in Table 8 below. The second filter media was prepared as follows. Four parts of Southern Bleached Softwood Kraft pulp roll underwent a defibering process in a Kamas hammermill before being combined with one part of TREVIRA 255 bicomponent fibers (core-sheath PET/PE, 2.2 dtex, 6 mm). The blended fibers then underwent forming of a mat at a rate of 3.6 meters per minute on a Spike forming line. The mat was finally consolidated in a through-air oven at 175° C. for 67 seconds to create a filter media with the properties in Table 12 below.

Figure 10:
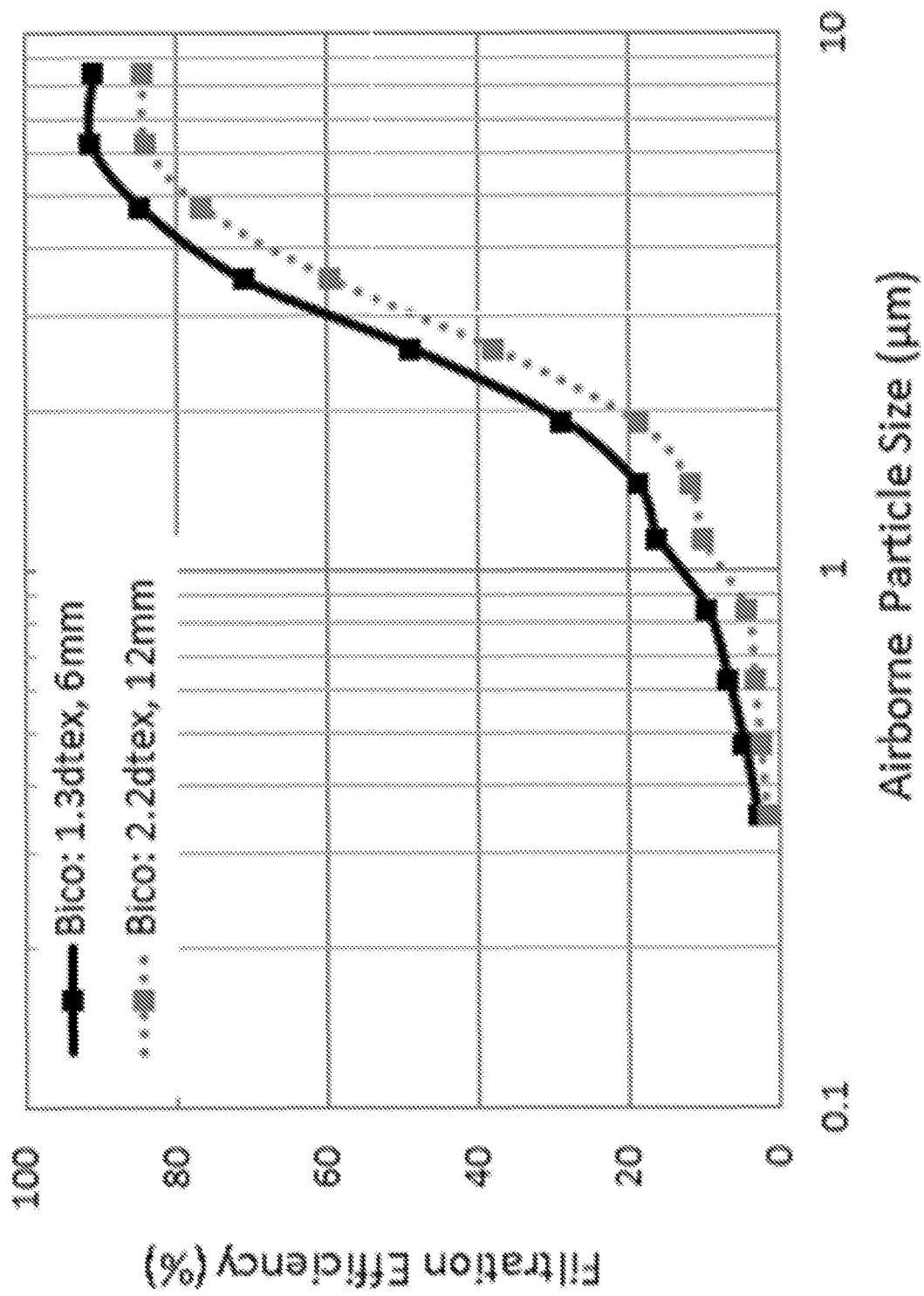
FIG. 10 shows a plot of filtration efficiency versus airborne particle size for filter media comprising different bonding materials according to the present disclosure.

FIG. 10 shows a plot of filtration efficiency versus airborne particle size for filter media comprising different binding materials according to Example 9. As can be seen in FIG. 10, the filter media prepared with the finer diameter, 1.3 dtex fibers had higher filtration efficiency as compared to the media prepared with the 2.2 dtex fibers over the entire range of airborne particle sizes tested. The filter media prepared with the finer diameter bicomponent fibers also had significantly higher tensile strength. This Example 9 illustrates how properties of the filter media can be controlled through proper selection of bonding fiber.

Example 10: Filter Media—Impact of Bicomponent Fiber Dosage

Two different filter media were prepared for Example 10. The first filter media was prepared as follows. Four parts of Southern Bleached Softwood Kraft pulp roll underwent a defibering process in a Kamas hammermill before being combined with one part of TREVIRA 255 bicomponent (bico) fibers (core-sheath PET/PE, 1.3 dtex, 6 mm). The blended fibers then underwent forming of a mat at a rate of 3.5 meters per minute on a Dan-Web forming line. The mat was finally consolidated in a through-air oven at 165° C. for 69 seconds to create a filter media with the properties in Table 9 below. The second filter media was prepared as follows. Seven parts of Southern Bleached Softwood Kraft pulp roll underwent a defibering process in a Kamas hammermill before being combined with three parts of TREVIRA 255 bicomponent fibers (core-sheath PET/PE, 1.3 dtex, 6 mm). The blended fibers then underwent forming of a mat at a rate of 3.5 meters per minute on a Dan-Web forming line. The mat was finally consolidated in a through-air oven at 165° C. for 69 seconds to create a filter media with the properties in Table 13 below.

TABLE 12

| | | | | Filter media properties | | | | | | | |
|---|---|---|---|---|---|---|---|---|---|---|---|
| | | Bulk | Tensile Strength | | | Filtration Performance Air flow velocity: 110 ft/min | | | | Pressure Drop | Permeability (cfm at 0.5 |
| Characteristics of bico fibers | Grammage (g/m$^2$) | (cm$^3$/g) | (kN/m) | | E1 | E2 | E3 | MERV | (inH$_2$O) | (Pa) | inH$_2$O) |
| | | | MD | CD | | | | | | | |
| 1.3 dtex, 6 mm | 83 | 29 | 0.357 | 0.224 | 5.9 | 28 | 84 | 8 | 0.13 | 33 | 354 |
| 2.2 dtex, 12 mm | 80 | 25 | 0.187 | 0.169 | 2.7 | 19 | 76 | 7 | 0.10 | 24 | 453 |

TABLE 13

Filter media properties

| Dosage of bico fibers (wt %) | Grammage (g/m²) | Bulk (cm³/g) | Tensile Strength (kN/m) MD | CD | Filtration Performance Air flow velocity: 110 ft/min E1 | E2 | E3 | MERV | Pressure Drop (inH₂O) | (Pa) | Permeability (cfm at 0.5 inH₂O) |
|---|---|---|---|---|---|---|---|---|---|---|---|
| 20 | 76 | 36 | 0.204 | 0.184 | 6.2 | 28 | 86 | 8 | 0.11 | 27 | 369 |
| 29 | 79 | 33 | 0.324 | 0.297 | 5.8 | 31 | 87 | 8 | 0.12 | 30 | 367 |

Figure 11:
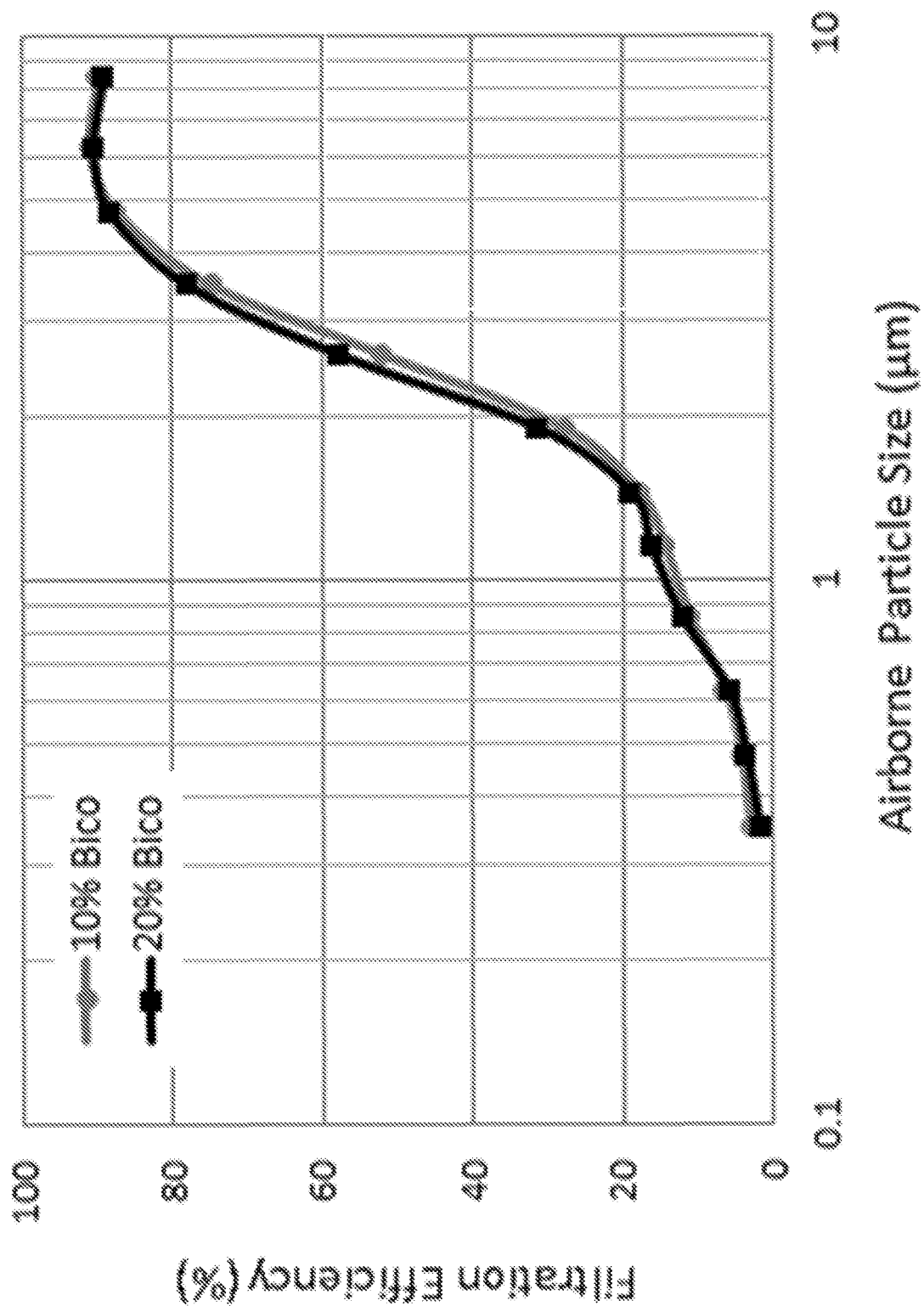
FIG. 11 shows a plot of filtration efficiency versus airborne particle size for filter media comprising different bonding material contents according to the present disclosure.

FIG. 11 shows a plot of filtration efficiency versus airborne particle size for filter media comprising different levels of binding material according to Example 10. As can be seen in FIG. 11 and Table 13, both filter media of Example 10 had similar filtration performance. However, the filter media containing a higher dosage of bicomponent fibers had higher tensile strength, as would be expected by one of ordinary skill in the art. The filter media of Example 10 were used to make the finished filters of Example 11.

Example 11: Finished Filter—Impact of Bicomponent Fiber Dosage

Figure 12:
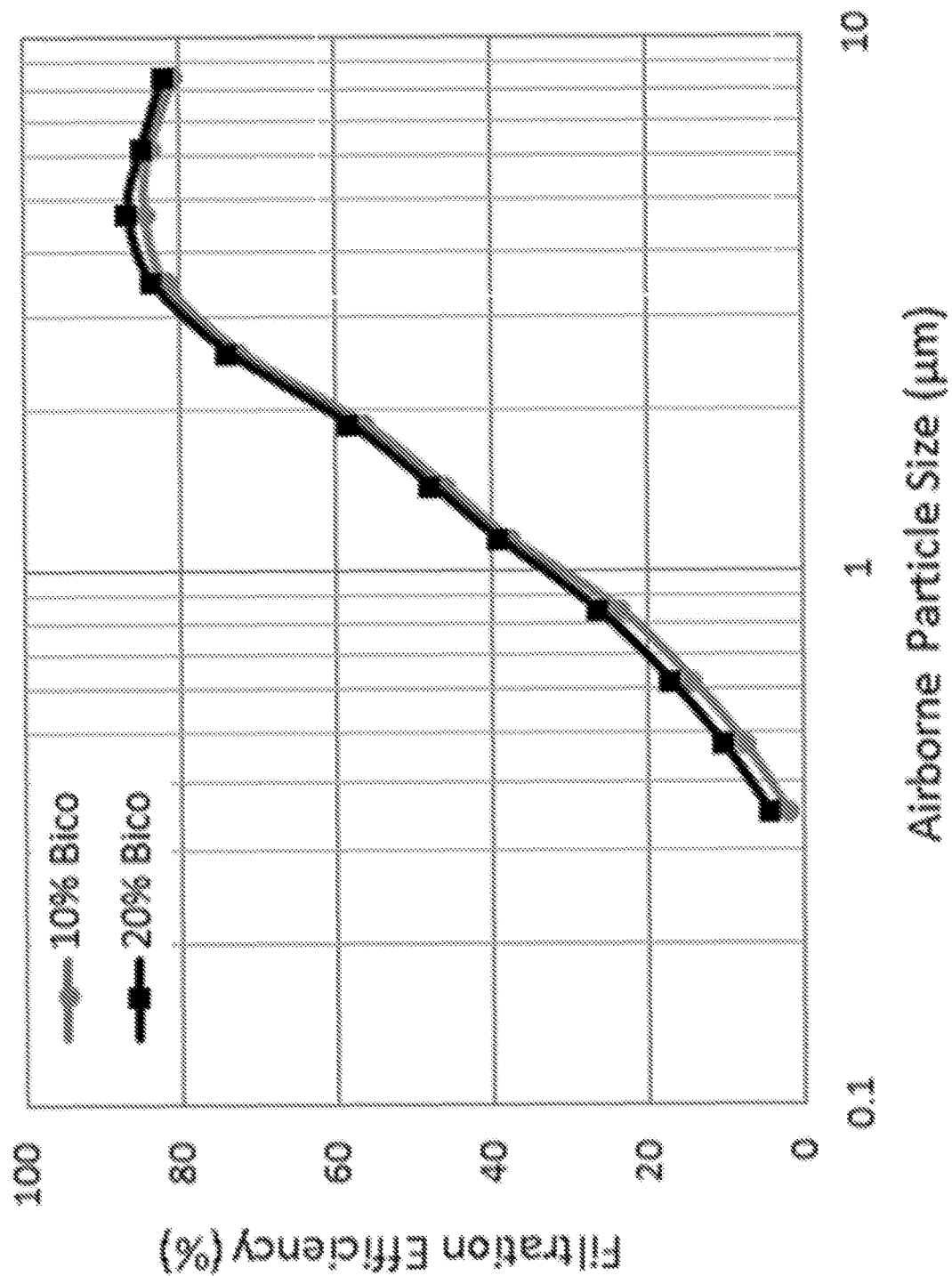
FIG. 12 shows a plot of filtration efficiency versus airborne particle size for filters comprising filter media with different bonding material contents according to the present disclosure.

Rolls of the two filter media prepared in Example 10 were converted to finished filters each having dimensions (height by width by depth, in inches) of 20×20×2. The converting process consisted of three separate steps performed sequentially. In order to increase the strength of the filter media and give it good pleatability, the rolls of media were first combined with a reinforcing wire mesh. This was performed using a hot-melt laminator in which an adhesive was applied to the mesh prior to its lamination to the filter media. The rolls of laminated filter media were then pleated using a Star Gear pleater from GMD Machinery. The pleating process involved unwinding the rolls of laminated filter media from an unwind station and passing the media through machined steel gears to create pleats in the media of nominal size 2 in. A pleat cutter located at the exit of the pleater was used to cut the pleated media into sections comprising 25 pleats. Finished filters were finally produced by inserting the different sections of pleated media into rigid cardboard frames that were then sealed with polyvinyl acetate glue. The two rolls of filter media from Example 8 were thus converted into finished filters without any issue, indicating that even at the 10% bicomponent (bico) fiber addition level, media prepared according to Example 10 had sufficient strength to withstand converting on commercial equipment. Lowering the dosage of bicomponent fibers in the filter media is expected to have a positive impact on its recyclability, compostability and biodegradability. Filters made from the two media were tested and had the following properties as shown in Table 14 below and in FIG. 12, which shows a plot of filtration efficiency versus airborne particle size. As seen in Table 14 and FIG. 12, the two finished filters had similar filtration efficiency. Flammability testing was also performed on the filter containing more bicomponent fibers. The filter did not meet the criteria defined by standard UL 900 because of the number of sparks generated during the test. This failure may reflect the fact that the filter media was not chemically treated before being converted to a finished filter.

TABLE 14

Filter properties

| Dosage of bico fibers (wt %) | Filtration Performance Air flow velocity: 492 ft/min E1 | E2 | E3 | MERV | Pressure Drop (inH₂O) | (Pa) | Dust Holding Capacity (g) | UL 900 Flame Extension (feet) | # Sparks | Smoke Density (in²) | Result |
|---|---|---|---|---|---|---|---|---|---|---|---|
| 20 | 12 | 53 | 83 | 10 | 0.47 | 117 | 82 | — | — | — | — |
| 29 | 15 | 55 | 84 | 10 | 0.51 | 127 | 83 | 5 | >100 | 0.03 | Fail |

Example 12: Filter Media—Pulp Treatment

Four parts of pulp treated with a 5% solution (of approximately 3.85% citric acid and approximately 1.15% sodium hypophosphite monohydrate, e.g., per U.S. Patent Application Publication No. 2016/0289895, which is incorporated herein by reference in its entirety) underwent a defibering process in a Kamas hammermill before being combined with one part of TREVIRA 255 bicomponent fibers (core-sheath PET/PE, 1.3 dtex, 6 mm). The blended fibers then underwent forming of a mat at a rate of 3.0 meters per minute on a Dan-Web forming line. The mat was finally consolidated in a through-air oven at 165° C. for 84 seconds to create a filter media with the properties in Table 15 below.

TABLE 15

Filter media properties

| Grammage (g/m²) | Bulk (cm³/g) | \multicolumn{4}{c|}{Filtration Performance Air flow velocity: 110 ft/min} | \multicolumn{2}{c|}{Pressure Drop} | Permeability (cfm at 0.5 inH₂O) |
|---|---|---|---|---|---|---|---|---|

| Grammage (g/m²) | Bulk (cm³/g) | E1 | E2 | E3 | MERV | (inH₂O) | (Pa) | (cfm at 0.5 inH₂O) |
|---|---|---|---|---|---|---|---|---|
| 106 | 21 | 5.6 | 23 | 78 | 8 | 0.08 | 20 | 468 |

Example 13: Finished Filter—Pulp Treatment

A roll of the filter media prepared in Example 12 was converted to finished filters having dimensions (height by width by depth, in inches) of 24×24×2. The converting process consisted of three separate steps performed sequentially. In order to increase the strength of the filter media and give it good pleatability, the roll of media was first combined with a reinforcing wire mesh. This was performed using a hot-melt laminator in which an adhesive was applied to the mesh prior to its lamination to the filter media. The roll of laminated filter media was then pleated using a Star Gear pleater from GMD Machinery. The pleating process involved unwinding the roll of laminated filter media from an unwind station and passing the media through machined steel gears to create pleats in the media of nominal size 2 in. A pleat cutter located at the exit of the pleater was used to cut the pleated media into sections comprising 30 pleats. Finished filters were finally produced by inserting the different sections of pleated media into rigid cardboard frames that were then sealed with polyvinyl acetate glue. The entire roll of filter media was thus converted into finished filters without any issue, indicating that media prepared according to Example 12 had sufficient strength to withstand converting on commercial equipment. The finished filters were tested and had the following properties as shown in Table 16 below. Finished prototypes prepared according to Example 13 had a MERV rating of 8, an acceptable pressure drop and a superior dust holding capacity. In addition, they satisfied flame resistance criteria defined by standard UL 900, indicating that the chemical treatment to impart flame resistance can be successfully applied at different stages in the manufacturing process.

TABLE 16

Filter properties

| | | | | \multicolumn{3}{c|}{Filtration Performance Air flow velocity: 492 ft/min} | | \multicolumn{3}{c|}{UL 900} | |
|---|---|---|---|---|---|---|---|---|---|---|---|

| E1 | E2 | E3 | MERV | Pressure Drop (inH₂O) | (Pa) | Dust Holding Capacity (g) | Flame Extension (feet) | # Sparks | Smoke Density (in²) | Result |
|---|---|---|---|---|---|---|---|---|---|---|
| 14 | 48 | 70 | 8 | 0.30 | 75 | 114 | 3.5 | 11 | 0.06 | Pass |

Example 14: Comparison Between Media of the Present Invention and Commercial Filter Media Four parts of Southern Bleached Softwood Kraft pulp roll underwent a defibering process in a Kamas hammermill before being combined with one part of TREVIRA 255 bicomponent fibers (core-sheath PET/PE, 1.3 dtex, 6 mm). The blended fibers then underwent forming of a mat at a rate of 3.7 meters per minute on a Spike forming line. The mat was finally consolidated in a through-air oven at 175° C. for 65 seconds to create a filter media with the properties in Table 17 below. Table 17 also includes properties measured on six different commercial filter media produced by different technologies (e.g., charged, mechanical, and split-film).

TABLE 17

Filter media properties

| Sample | Grammage (g/m²) | \multicolumn{4}{c|}{Filtration Performance Air flow velocity 110 ft/min} | \multicolumn{2}{c|}{Pressure Drop} |
|---|---|---|---|---|---|---|---|

| Sample | Grammage (g/m²) | E1 | E2 | E3 | MERV | (inH₂O) | (Pa) |
|---|---|---|---|---|---|---|---|
| Media prototype | 71 | 4.3 | 22 | 78 | 8 | 0.108 | 27 |
| Comme 1 | 68 | 26 | 55 | 86 | 10 | 0.090 | 22 |
| 2 | 73 | 29 | 57 | 87 | 10 | 0.090 | 22 |
| 3 | 68 | 24 | 56 | 86 | 10 | 0.085 | 21 |
| 4 | 67 | 9.2 | 40 | 69 | 7 | 0.100 | 25 |
| 5 | 123 | 0.8 | 16 | 75 | 7 | 0.105 | 26 |
| 6 | 158 | 0.4 | 10 | 68 | 7 | 0.09 | 22 |

Figure 13:
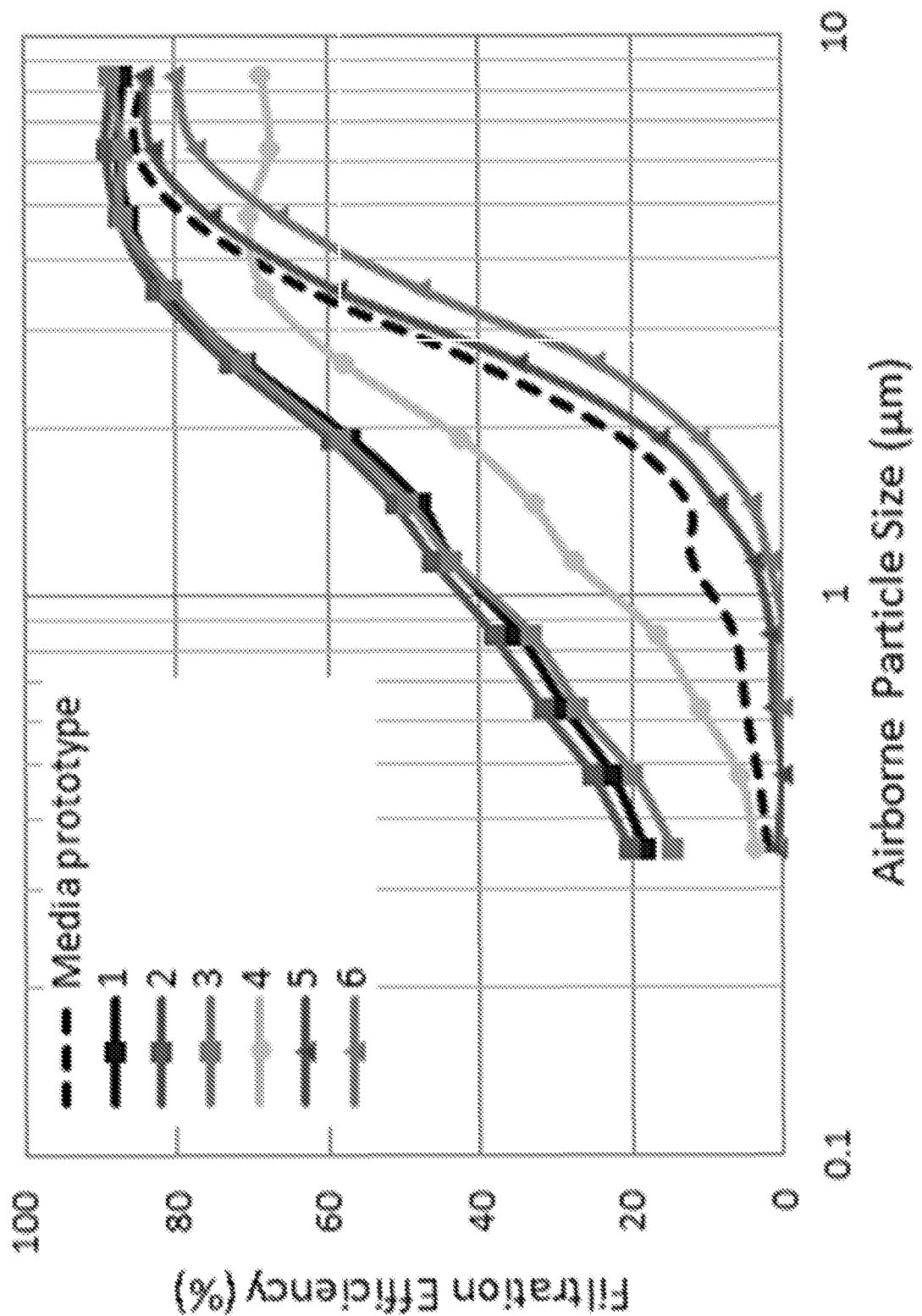
FIG. 13 shows a plot of filtration efficiency versus airborne particle size for filter media according to the present disclosure as compared to commercial filter media produced by different technologies (e.g., charged, mechanical, and split-film).

FIG. 13 shows a plot of filtration efficiency versus airborne particle size for filter media of Example 14 as compared to the six commercial filter media. As can be seen in Table 17 and in FIG. 13, the filter media of Example 14 outperformed some of the commercial media in terms of MERV rating while, in some cases, having lower grammage. The pressure drop measured across the filter media of Example 14 was similar or slightly higher than that measured across the different commercial media.

Example 15: Impact of Grammage and Compaction on Filter Media and Filter Properties Example 15 includes nine different filter media illustrating the impact of grammage, compaction and dosage of bicomponent fibers. In all cases, a roll of Southern Bleached Softwood Kraft (SBSK) pulp underwent a defibering process in a Kamas hammermill before being combined with TREVIRA 255 bicomponent (bico) fibers (core-sheath PET/PE, 1.3 dtex, 6 mm). The proportion of SBSK and bicomponent fibers in the mixture was adjusted depending on the desired bico content for each sample. The bico content percentages given in Table 18 below are based on dry media weight prior to chemical treatment. The blended fibers then underwent mat forming on a Dan-Web line and some of the media were then compacted under a pressure of 0.5 bars applied by a smooth cylindrical roller at either room temperature at 90° C. (in addition to the weight of the roller itself). The filter media subsequently underwent consolidation in an oven at 180 to 190° C. for 80 seconds. The consolidated filter media was then treated with a solution of citric acid and sodium hypophosphite monohydrate following the procedure described in Example 6 above. The amounts of citric acid and sodium hypophosphite monohydrate added to the filter media in this manner were 5.77 and 1.73%, respectively, based on dry media weight prior to treatment. In the case of media 1, 2 and 6, the filter media then underwent a second chemical treatment step, identical to the first one except that the solution was now applied to the opposite side of the filter media. The total amount of chemicals added to the filter media after the two chemical treatment steps was thus 15%, based on dry media weight prior to the first treatment. The nine filter media thus created had properties shown in Table 18 below.

TABLE 18

Filter media properties

| Media ID | Bico Content (%) | Media Compaction | Caliper (μm) | Dosage of Chemicals (%) | Grammage after Treatment (g/m²) | Filtration Performance Air flow velocity: 110 ft/min | | | | Pressure Drop | |
|---|---|---|---|---|---|---|---|---|---|---|---|
| | | | | | | E1 | E2 | E3 | MERV | (inH₂O) | (Pa) |
| 1 | 20 | No | 3199 | 15 | 114 | 9 | 32 | 86 | 8 | 0.14 | 35 |
| 2 | 20 | Yes | 2096 | 15 | 115 | 9 | 46 | 91 | 9 | 0.21 | 53 |
| 3 | 17 | Yes | 1131 | 7.5 | 86 | 7 | 57 | 89 | 10 | 0.25 | 62 |
| 4 | 19 | No | 1315 | 7.5 | 66 | 1 | 22 | 73 | 8 | 0.08 | 20 |
| 5 | 19 | Yes | 1153 | 7.5 | 70 | 4 | 48 | 85 | 9 | 0.185 | 46 |
| 6 | 20 | No | 2203 | 15 | 69 | 4 | 22 | 74 | 8 | 0.09 | 22 |
| 7 | 22 | Yes | 903 | 7.5 | 63 | 10 | 53 | 86 | 10 | 0.18 | 45 |
| 8 | 22 | Yes | 794 | 7.5 | 49 | 6 | 46 | 87 | 9 | 0.13 | 32 |
| 9 | 7.5 | Yes | 826 | 7.5 | 60 | 11 | 49 | 77 | 9 | 0.19 | 46 |

MERV ratings covered a range from 8 to 10, reflecting variations in grammage and showing the effect of compaction.

At a constant grammage, the compaction increased both filtration efficiency and MERV rating, but at the expense of pressure drop. Compaction with a roller also increased the strength of the filter media as shown in Table 19. As an example, media 4 and 5 had similar bico content and grammage but media 5 had a much higher tensile strength. Without wishing to be bound by theory, it is suggested that the difference in tensile strength may be attributed to the fact that compaction increases the area of contact between fibers in the media, leading to more efficient bonding during consolidation. Similarly, the compacted filter media 9 had higher tensile strength than the uncompacted filter media 4 in spite of the fact that it had lower grammage and comprised much fewer bicomponent fibers. It is possible to reduce media grammage and maintain MERV by compacting the media. Compaction may also result in an increase the linear footage of the filter media on a roll of fixed diameter.

TABLE 19

Tensile properties of filter media

| Media ID | Bico Content (%) | Media Compaction | Grammage after Treatment (g/m²) | Machine Direction Tensile Strength (daN) |
|---|---|---|---|---|
| 4 | 19 | No | 66 | 0.53 |
| 5 | 19 | Yes | 70 | 3.78 |
| 9 | 7.5 | Yes | 60 | 0.90 |

TABLE 20

Filter properties

| Media ID | Pleat Count | Filtration Performance Air flow velocity: 492 ft/min | | | | Pressure Drop | | Dust Holding Capacity (g) |
|---|---|---|---|---|---|---|---|---|
| | | E1 | E2 | E3 | MERV | (inH₂O) | (Pa) | |
| 1 | 30 | 11 | 46 | 72 | 8 | 0.37 | 92 | 119 |
| 2 | 30 | 9 | 50 | 81 | 10 | 0.37 | 92 | 87 |
| 6 | 30 | 6 | 37 | 62 | 7 | 0.26 | 64 | 127 |

Media 1, 2 and 6 were converted into filters having dimensions (height by width by depth, in inches) of 24×24×2 and a pleat count of 30 by the conversion process consisting of three separate steps as described in Example 2 above. The resulting filters had properties shown in Tables 19 and 20. Filters made from the compacted media 2 had a MERV rating of 10 instead of 8 for filters made from the uncompacted filter media 1, at the same pressure drop. However, the filter made from the compacted media had a lower dust-holding capacity (DHC). Filters made from filter media 6 had a MERV rating of 7, an initial pressure drop of 64 Pa and a dust-holding capacity of 127 g.

Media 7 was also converted into filters having dimensions (height by width by depth, in inches) of 20×20×2 and a pleat count of 17 by the conversion process described in Example 2 above. The filter thus created had the following properties as shown in Table 21 below. Results from UL 900 testing confirmed that a filter made from a compacted media comprising SBSK fibers and treated chemically with a standard flame-resistant composition met the requirements for that test.

TABLE 21

Filter properties

| Media | | | | | Pressure Drop | | Dust Holding Capacity | Flame Extension | UL 900 | | | |
|---|---|---|---|---|---|---|---|---|---|---|---|---|
| | | | | | | | | | Number of | Smoke Density | | |
| ID | E1 | E2 | E3 | MERV | (inH₂O) | (Pa) | (g) | (feet) | Sparks | (in²) | Result |
| 7 | 19 | 65 | 77 | 9 | 0.46 | 115 | 21 | 3 | 5 | 0.03 | Pass |
| | | | | | | | | 3 | 2 | 0.03 | Pass |

Example 16: Comparison of Mechanical Pulp with SBSK Pulp and Effect of Compaction on Filter Media and Filter Properties Several filter media and some finished filters were also prepared with either Bleached Chemi-Thermomechanical Pulp (BCTMP) or Thermo-Mechanical Pulp (TMP). The BCTMP pulp was a softwood pulp with a Canadian Standard Freeness of 625 mL that was collected from a bale and underwent a defibering process in a hammermill prior to formation of the mat. The TMP pulp was pressed to a consistency of ~35% before being dried in a tumble-dryer and defibered in a hammermill.

The two filter media containing BCTMP pulp were produced as follows. Four parts of defibered BCTMP pulp were combined with one part of TREVIRA 255 bicomponent fibers (core-sheath PET/PE, 1.3 dtex, 6 mm). The blended fibers then underwent forming of a mat at a rate of 3.7 meters per minute on a Dan-Web forming line. For one sample, the filter media was then compacted at a pressure of 0.5 bar applied by a smooth cylindrical roller before being consolidated in an oven at 90 C for 80 seconds. For the other sample, the filter media did not undergo compaction but was simply consolidated in the oven. The target grammage was 100 gsm for the uncompacted media and 85 gsm for the compacted media. Both samples then underwent chemical treatment with a solution of citric acid and sodium hypophosphite monohydrate as described in Example 6. The amounts of citric acid and sodium hypophosphite monohydrate added to the filter media were 5.77 and 1.73%, respectively, based on dry media weight prior to treatment.

The three filter media containing TMP pulp were produced as follows. Four parts of defibered TMP pulp were combined with one part of TREVIRA 255 bicomponent fibers (core-sheath PET/PE, 1.3 dtex, 6 mm). The blended fibers then underwent forming of a mat at a rate of 3.7 meters per minute on a Dan-Web forming line. In all cases, the filter media was then compacted at a pressure of 0.5 bar applied by a smooth cylindrical roller at 110° C. before being consolidated in an oven at 180 to 185° C. for 73 seconds. The filter media then underwent chemical treatment with a solution of citric acid and sodium hypophosphite monohydrate as described in Example 6. The amounts of citric acid and sodium hypophosphite monohydrate added to the filter media were 5.77 and 1.73%, respectively, based on dry media weight prior to treatment.

The five filter media containing mechanical pulp and created in the manner described above had properties shown in Tables 22a and 22b below, which also include the same properties measured on filter media samples 1 and 2 comprising SBSK pulp, from Example 15.

TABLE 22a

Filter media properties

| Media ID | Pulp | Media compaction | Caliper (μm) | Dosage of Chemicals (%) | Grammage after treatment (g/m²) | Permeability (cfm at 0.5 inH₂O) |
|---|---|---|---|---|---|---|
| 1 | SBSK | No | 3199 | 15 | 114 | 304 |
| 2 | SBSK | Yes | 2096 | 15 | 115 | 262 |
| 3 | BCTMP | No | 2563 | 7.5 | 105 | 418 |
| 4 | BCTMP | Yes | 1296 | 7.5 | 95 | 344 |
| 5 | TMP | Yes | 1228 | 7.5 | 88 | 270 |
| 6 | TMP | Yes | 1154 | 7.5 | 78 | 316 |
| 7 | TMP | Yes | 797 | 7.5 | 62 | 339 |

TABLE 22b

Filtration performance of filter media

Filtration Performance
Air flow velocity: 110 ft/min

| Media ID | Pulp | E1 | E2 | E3 | MERV | Pressure Drop (inH₂O) | (Pa) |
|---|---|---|---|---|---|---|---|
| 1 | SBSK | 9 | 32 | 86 | 8 | 0.14 | 35 |
| 2 | SBSK | 9 | 46 | 91 | 9 | 0.21 | 53 |
| 3 | BCTMP | 6 | 28 | 78 | 8 | 0.11 | 27 |
| 4 | BCTMP | 4 | 40 | 82 | 9 | 0.15 | 37 |
| 5 | TMP | 13 | 52 | 85 | 10 | 0.21 | 51 |
| 6 | TMP | 7 | 43 | 78 | 9 | 0.17 | 41 |
| 7 | TMP | 7 | 40 | 71 | 8 | 0.15 | 37 |

A lower pressure drop was achieved with BCTMP pulp as compared to a similar media made from SBSK. Both media had a MERV rating of 8. Non-compressed media made from BCTMP achieved the same MERV rating at a lower pressure drop than a media of similar grammage (prior to chemical treatment) made from SBSK. Further, compressed media made from BCTMP achieved the same MERV rating at a lower pressure drop than a media of higher grammage made from SBSK.

The TMP media 6 was converted into finished filters having dimensions (height by width by depth, in inches) of 20×20×2 and varying number of pleats by the process described in Example 2 above. The resulting filters had properties shown in Tables 23 and Table 24. Results from UL 900 testing shown in Table 23 were obtained in duplicate and confirm that filters made from chemically treated filter media pass the UL 900 test.

TABLE 23

Filter properties (filtration performance)

Filtration Performance
Air flow velocity: 492 ft/min

| Media ID | Pulp | Dosage of Chemicals (%) | Pleat Count | E1 | E2 | E3 | MERV | Pressure Drop (inH$_2$O) | (Pa) | Dust Holding Capacity (g) |
|---|---|---|---|---|---|---|---|---|---|---|
| 6 | TMP | 7.5 | 17 | 19 | 67 | 75 | 9 | 0.50 | 127 | 23 |
|   |     |     | 25 | 12 | 58 | 76 | 9 | 0.39 | 97  | 24 |

TABLE 24

Filter properties (flame resistance testing)

| | | | UL 900 | | | |
|---|---|---|---|---|---|---|
| Media ID | Pulp | Pleat Count | Flame Extension (feet) | Number of Sparks | Smoke Density (in$^2$) | Result |
| 6 | TMP | 17 | 4 | 2 | 0.05 | Pass |
|   |     | 17 | 4 | 2 | 0.04 | Pass | sodium hypophosphate monohydrate applied to one side of the mat, but in a more concentrated form. The third treatment was 4% w/w/ citric acid and sodium hypophosphate monohydrate on each side (total 8% w/w citric acid and sodium hypophosphate monohydrate). The mat was finally consolidated in a through-air oven at 175° C. for 65 seconds to create a filter media. The filter media were converted into filters and then tested according to UL 900. The results (in duplicates) shown in Table 25 below demonstrate that filter prototypes made from the three different media all passed the UL 900 test.

TABLE 25

UL 900 results

| | | | | UL 900 | | |
|---|---|---|---|---|---|---|
| Sample ID | Media description | Size (24" or 20") | # of pleats | Flame Extension (feet) | # Sparks | Smoke Density (in$^2$) | Result |
| 1 | 7.5% chemicals, one side | 20 | 16 | 3 | 3 | 0 | Pass |
|   |                         |    |    | 3 | 5 | 0.03 | Pass |
| 2 | 7.5% chemicals, higher concentration | 24 | 20 | 6 | 4 | 0.08 | Pass |
|   |                                      |    |    | 3 | 4 | 0.11 | Pass |
| 3 | 4% chemicals, each side | 24 | 20 | 9 | 2 | 0.11 | Pass |
|   |                         |    |    | 8 | 2 | 0.08 | Pass |

Example 17: Effect of Chemical Treatment on Filter Media and Filter Properties on Flame-Resistance (Method of Application and Concentration of the Solution)

Four parts of Southern Bleached Softwood Kraft (SBSK) pulp roll underwent a defibering process in a Kamas hammermill before being combined with one part of TREVIRA 255 bicomponent fibers (core-sheath PET/PE, 1.3 dtex, 6 mm). The target bicomponent content was 20% and the target grammage before treatment was 80 gsm. The blended fibers then underwent forming of a mat at a rate of 3.7 meters per minute on a Dan-web forming line. Different standard flame resistant treatments comprising citric acid were applied to the mat. One treatment was 7.5% w/w citric acid and sodium hypophosphate monohydrate applied to one side of the mat. The second treatment was 7.5 w/w citric acid and Example 18: Example of Latex Bonded Media A roll of Southern Bleached Softwood Kraft (SBSK) pulp underwent a defibering process in a Kamas hammermill before undergoing forming of a mat at a rate of 3.0 meters per minute on a Dan-Web forming line. The target grammage was 75 gsm. A dispersion of Acronal LN 579S latex was then applied to the filter media using a spraying system installed on the Dan-Web line. The media was then consolidated in a through-air oven at 190° C. for 80 seconds. The amount of dry polymer added to the filter media in this manner was 10%, based on dry media weight prior to latex addition. The bonded filter media then underwent a second latex addition step, identical to the first one except that the latex was now applied to the opposite side of the media. The total amount of dry polymer added to the filter media after the two latex addition steps was thus 20%, based on dry media weight prior to any addition of latex. The filter media bonded with latex had the properties shown in Table 26.

TABLE 26

Filter media properties

| Grammage (g/m²) | Filtration Performance Air flow velocity: 110 ft/min | | | | Pressure Drop | | Permeability (cfm at 0.5 inH₂O) |
|---|---|---|---|---|---|---|---|
| | E1 | E2 | E3 | MERV | (inH₂O) | (Pa) | |
| 70 | 2.2 | 18 | 68 | 7 | 0.07 | 17 | 519 |

Three additional filter media samples bonded with latex were produced in a subsequent trial. The spraying system used in that trial consisted of three spray nozzles (UniJet, type TP and orifice number 730039), fixed to a spray boom such that the opening of the nozzles was located 30 cm above the conveyor belt.

The first filter media was produced as follows. A roll of Southern Bleached Softwood Kraft (SBSK) pulp underwent a defibering process in a Kamas hammermill before undergoing forming on a Dan-Web forming line. The target grammage was 65 gsm. The filter media was then compacted under a pressure of 0.5 bars applied by a smooth cylindrical roller at 90° C. (in addition to the weight of the roller itself). A latex dispersion of a heat-crosslinking copolymer of acrylic esters and acrylonitrile (Acronal LN 579S latex from BASF) diluted to a concentration of 11.9 g/L was then applied to the filter media using the spraying system described above. The media was subsequently consolidated in a through-air oven at 180° C. for 80 seconds. The amount of dry polymer added to the filter media in this manner was 5%, based on dry media weight prior to latex addition. The bonded filter media then underwent a second latex addition step, identical to the first one except that the latex was now applied to the opposite side of the media. The total amount of dry polymer added to the filter media after the two latex addition steps was thus 10%, based on dry media weight prior to any addition of latex.

The second filter media sample was produced in the same way as the first media sample except that the latex added to the media was a dispersion of polylactic acid (Landy PL-3000 from Miyoshi Oil & Fat Co., LTD.) diluted to a concentration of 11.9 g/L. That second filter media sample is expected to be fully biodegradable and compostable as it comprises only cellulosic fibers and polylactic acid.

The third filter media sample was produced in the same way as the first media sample except that fourteen parts of defibered Southern Bleached Softwood Kraft (SBSK) pulp were combined with one part of TREVIRA 255 bicomponent fibers (core-sheath PET/PE, 1.3 dtex, 6 mm) prior to the mat forming step on the Dan-Web line. As was the case with the first filter media sample, the total amount of dry polymer (Acronal LN 579S) added to the filter media after the two latex addition steps was 10%, based on dry media weight prior to any addition of latex. Properties of the three filter media described above are shown in Table 27 below.

TABLE 27

| Sample ID | Grammage (g/m²) | Dosage of bico fibers (wt %) | Filtration Performance Air flow velocity: 110 ft/min | | | | Pressure Drop | | Permeability (cfm at 0.5 inH₂O) | Caliper (µm) | Machine Direction Tensile Strength (daN) |
|---|---|---|---|---|---|---|---|---|---|---|---|
| | | | E1 | E2 | E3 | MERV | (inH₂O) | (Pa) | | | |
| 1 | 74 | 0 | 14 | 66 | 92 | 10 | 0.29 | 72 | 216 | 765 | 0.97 |
| 2 | 73 | 0 | 14 | 63 | 86 | 10 | 0.28 | 70 | 201 | 793 | 1.08 |
| 3 | 71 | 6.2 | 9 | 52 | 84 | 10 | 0.23 | 56 | 256 | 875 | 1.61 |

Certain embodiments of the present invention relate to one or more of the following non-exhaustive list of items.

Item 1. A filter media comprising: 50% or greater of a cellulosic pulp fiber, by weight of the filter media; a bonding material; and 3% or greater of a flame-resistant treatment composition; wherein the filter media has a MERV (ed. 2017) rating of 7 or greater.

Item 2. The filter media of item 1, whereby, when the filter media is converted to a filter, the filter meets the flammability requirements defined by UL 900 (8th ed. 2015).

Item 3. The filter media of items 1 or 2, wherein the bonding material comprises a bicomponent fiber.

Item 4. The filter media of any one of items 1-3, wherein the flame-resistant treatment composition comprises a carboxylic acid.

Item 5. The filter media of any one of items 1-4, wherein the flame-resistant treatment composition comprises citric acid, sodium hypophosphite, and/or combinations thereof.

Item 6. The filter media of any one of items 1-5, wherein filter media comprises 70% or greater cellulosic pulp fiber, by weight of the filter media.

Item 7. The filter media of any one of items 1-6, wherein the filter media has an initial pressure drop from 0.02 inH₂O to 0.45 inH₂O.

Item 8. The filter media of any one of items 1-7, wherein the filter media has an initial pressure drop from 0.02 inH₂O to 0.37 inH₂O.

Item 9. The filter media of any one of items 1-8, wherein the filter media has a dust holding capacity of 30 g/sq.ft. to 160 g/sq.ft. at an air flow rate of 110 ft/min and a final pressure drop of 0.02 inH₂O to 1.0 inH₂O.

Item 10. The filter media of any one of items 1-9, wherein the filter media is biodegradable, recyclable, and/or compostable.

Item 11. A filter comprising: a filter media comprising: 50% or greater of a cellulosic pulp fiber, by weight of the filter media; a bonding material; and 3% or greater of a flame-resistant treatment composition, by weight of the filter media; wherein the filter meets the flammability requirements defined by UL 900 (8th ed. 2015).

Item 12. The filter of item 11, wherein the filter media is supported by a backing.

Item 13. The filter of item 11, wherein the filter media is self-supporting.

Item 14. The filter of any of items 11-13, wherein the filter has a dust-holding capacity of 30 grams to 160 grams for at least a 20 inch by 20 inch by 2 inch filter at an air flow rate of 492 ft/min and a pressure drop of 0.02 inH$_2$O to 1.5 inH$_2$O.

Item 15. The filter of any one of items 11-14, wherein the filter has a MERV (8th ed. 2015) rating of 7 or greater.

Item 16. The filter of any one of items 11-15, wherein the filter has an initial pressure drop of 0.45 inH$_2$O or less.

Item 17. The filter of any one of items 11-16, wherein the filter is an HVAC filter.

Item 18. A method of making a filter media comprising: blending a fibrous material with a bonding material; forming an airlaid mat comprising the fibrous material and the bonding material; heating the airlaid mat to bond the airlaid mat; treating the bonded airlaid mat with a flame-resistant treatment composition to produce a treated airlaid mat; and heating the treated airlaid mat to form a bonded or consolidated airlaid mat.

Item 19. A method of making a filter media comprising: forming an airlaid mat comprising a fibrous material; treating the airlaid mat with a flame-resistant treatment composition and a bonding material to produce a treated airlaid mat; and heating the treated airlaid mat to bond the treated airlaid mat.

Item 20. A method of making a filter media comprising: blending a fibrous material with a bonding material; forming an airlaid mat comprising the fibrous material and the bonding material; heating the airlaid mat to bond the airlaid mat; treating the bonded airlaid mat with a flame-resistant treatment composition to produce a treated airlaid mat; heating the treated bonded airlaid mat; optionally treating the treated bonded airlaid mat with a second composition; optionally heating the treated bonded airlaid mat; and optionally repeating the treatment and heating steps one or more times.

Item 22. A method of making a filter media comprising: defibering a roll of pulp to produce a loose fibrous material; treating the loose fibrous material with a flame-resistant treatment composition to produce a treated fibrous material; heating the treated fibrous material; blending the treated fibrous material with a bonding material; forming an airlaid mat comprising the treated fibrous material and the bonding material; and heating the airlaid mat to bond the airlaid mat.

Item 23. A method of making a filter media comprising: defibering a roll of pulp to produce a loose fibrous material; treating the loose fibrous material with a fire-resistant treatment composition to form a treated fibrous material; heating the treated fibrous material; forming an airlaid mat comprising the treated fibrous material; treating the airlaid mat with a bonding material to form a treated airlaid mat; and heating the treated airlaid mat to bond the airlaid mat.

Item 24. The method of any one of items 18-22, wherein the fibrous material comprises defibered pulp, fluffy pulp, or uncompacted pulp.

Item 25. The method of any one of items 18-22, wherein the method further comprises a step of defibering the pulp.

Item 26. The method of item 25, wherein the step of defibering comprises hammermilling.

Item 27. The method of any one of items 18-25, wherein the step of forming comprises compressing the fibrous material.

Item 28. The method of any one of items 18-26, wherein the step of heating the treated airlaid mat to bond the airlaid mat further comprises compacting the treated airlaid mat.

Item 29. The method of any one of items 18-27, wherein the bonded treated airlaid mat is compacted with heat.

Item 30. The method of item 20, wherein the second composition and/or third composition is the fire-resistant treatment composition.

Item 31. The method of item 20, wherein the first composition is applied to one side of the filter media and the second composition is applied to a second side of the filter media.

Item 32. A method of making a filter, comprising: laminating and/or pleating the filter media according to any one of items 1-10.

Item 33. A method of making a filter, comprising: laminating and/or pleating the filter media made according to the method of any one of items 18-30.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based can be readily utilized as a basis for the design of other structures, methods, and systems for carrying out the several purposes of the embodiments and claims presented in this application. It is important, therefore, that the claims be regarded as including such equivalent constructions.

What is claimed is:

1. A filter media consisting of:
a single layer of 50% or greater of a cellulosic pulp fiber, by weight of the filter media, a bonding material, and 3% or greater of a flame-resistant treatment composition, by weight of the filter media, the flame-resistant treatment composition consisting of citric acid, sodium hypophosphite, and combinations thereof;
wherein the filter media has a MERV (ed. 2017) rating of 7 or greater,
wherein the filter media has an initial pressure drop from 0.02 inH$_2$O to 0.45 inH$_2$O at an air flow rate of 110 ft/min, a thickness of 800 μm to 3200 μm, a permeability of 200 cubic ft/min (CFM) to 1000 CFM at 0.5 inH$_2$O, and a density of 0.03 g/cm$^3$ to 0.10 g/cm$^3$,
wherein the filter media has a dust holding capacity of 30 g/sq.ft. to 50 g/sq.ft. measured at an air flow rate of 110 ft/min and a final pressure drop of 1.0 inH$_2$O, and
whereby, when the filter media is converted to a filter, the filter meets the flammability requirements defined by UL 900 (8$^{th}$ ed. 2015).

2. The filter media of claim 1, wherein the bonding material consists of a liquid binder and/or a bicomponent fiber.

3. The filter media of claim 1, wherein the filter media comprises 70% or greater cellulosic pulp fiber, by weight of the filter media.

4. The filter media of claim 1, wherein the filter media has an initial pressure drop from 0.02 inH$_2$O to 0.37 inH$_2$O measured at an air flow rate of 110 ft/min.

5. The filter media of claim 1, wherein the filter media is biodegradable, recyclable, and/or compostable.

6. The filter media of claim 1, wherein the filter media has a density of 0.03 to 0.06 g/cm$^3$.

7. A filter comprising:
a filter media comprising the filter media of claim 1,
wherein the filter meets the flammability requirements defined by UL 900 (8$^{th}$ ed. 2015),
wherein the filter has a MERV (8$^{th}$ ed. 2015) rating of 7 or greater, and
wherein the filter has an initial pressure drop of 0.45 inH$_2$O or less at an air flow rate of 492 ft/min, and a dust holding capacity of 21 g to 160 g at an air flow rate of 492 ft/min and a final pressure drop of 1.5 inH$_2$O.

8. The filter of claim 7, wherein the filter media is supported by a backing.

9. The filter of claim 7, wherein the filter media is self-supporting.

10. The filter of claim 7, wherein the filter has a dust-holding capacity of 30 grams to 160 grams for at least a 20 inch by 20 inch by 2 inch filter at an air flow rate of 492 ft/min and a final pressure drop of 1.5 inH$_2$O.

11. The filter of claim 7, wherein the filter is an HVAC filter.

12. The filter of claim 7, wherein the bonding material consists of a liquid binder and/or a bicomponent fiber.

13. A method of making the filter media of claim 1 comprising:
blending the cellulosic pulp fiber with the bonding material;
forming an airlaid mat comprising the cellulosic pulp fiber and the bonding material;
heating the airlaid mat to bond the airlaid mat;
treating the bonded airlaid mat with the flame-resistant treatment composition to produce a treated airlaid mat; and
heating the treated airlaid mat to form a bonded or consolidated airlaid mat.

14. The method of making a filter media of claim 13 further comprising:
optionally heating the treated bonded airlaid mat; and
optionally repeating the heating step one or more times.

15. A method of making a filter, comprising:
laminating and/or pleating the filter media according to claim 1.

* * * * *